(12) United States Patent
De Sloovere et al.

(10) Patent No.: US 7,864,309 B2
(45) Date of Patent: Jan. 4, 2011

(54) NON CONTACT WHEEL ALIGNMENT SENSOR AND METHOD

(75) Inventors: Kris De Sloovere, Nazareth (BE); Didier Beghuin, Enghien (BE); Koen Verhaert, Antwerp (BE)

(73) Assignees: Burke E. Porter Machinery Company, Grand Rapids, MI (US); Verhaert New Products & Services NV, Kruibeke (BE)

( * ) Notice: Subject to any disclaimer, the term of this patent is extended or adjusted under 35 U.S.C. 154(b) by 323 days.

(21) Appl. No.: 12/113,300

(22) Filed: May 1, 2008

(65) Prior Publication Data

US 2008/0273194 A1 Nov. 6, 2008

Related U.S. Application Data

(60) Provisional application No. 60/916,004, filed on May 4, 2007.

(51) Int. Cl.
*G01B 11/26* (2006.01)
(52) U.S. Cl. .............................. 356/139.09; 356/139.08
(58) Field of Classification Search ............ 356/139.09, 356/3–3.15, 4.01–4.1, 5.01–5.15, 6–22, 28, 356/28.5, 139.01
See application file for complete search history.

(56) References Cited

U.S. PATENT DOCUMENTS

| 3,630,623 | A | 12/1971 | Schirmer |
| 3,918,816 | A | 11/1975 | Foster et al. |
| 4,639,878 | A | 1/1987 | Day et al. |
| 4,647,208 | A | 3/1987 | Bierman |
| 4,690,557 | A | 9/1987 | Wiklund |
| 4,724,480 | A | 2/1988 | Hecker et al. |
| 4,863,266 | A | 9/1989 | Masuko et al. |
| RE33,144 | E | 1/1990 | Hunter et al. |

(Continued)

FOREIGN PATENT DOCUMENTS

DE 2948573 A1 12/1979

(Continued)

OTHER PUBLICATIONS

International Search Report of corresponding PCT application No. PCT/US08/62424.

(Continued)

*Primary Examiner*—Thomas H Tarcza
*Assistant Examiner*—Luke D Ratcliffe
(74) *Attorney, Agent, or Firm*—Van Dyke, Gardner, Linn & Burkhart, LLP

(57) ABSTRACT

A sensor and method of determining the orientation of an object, such as the alignment characteristics of a tire and wheel assembly mounted on a vehicle, includes projecting a plurality of light planes from a first light projector onto a tire and wheel assembly to form a plurality of generally parallel illumination lines on a tire of the tire and wheel assembly, receiving a reflected image of at least some of the illumination lines with a photo electric device reflected from the tire at an angle relative to a projecting angle of the first light projector, and determining a plane defined by spatial coordinates from a selected point located on each illumination line imaged by the photo electric device, with the plane representing the orientation of the tire and wheel assembly.

22 Claims, 13 Drawing Sheets

U.S. PATENT DOCUMENTS

| | | | |
|---|---|---|---|
| 4,899,218 A | 2/1990 | Waldecker et al. | |
| 4,931,964 A | 6/1990 | Titsworth et al. | |
| 5,018,853 A | 5/1991 | Hechel et al. | |
| 5,044,746 A | 9/1991 | Henseli | |
| 5,048,954 A * | 9/1991 | Madey et al. | 356/155 |
| 5,054,918 A | 10/1991 | Downing et al. | |
| 5,177,558 A | 1/1993 | Hill | |
| 5,198,877 A | 3/1993 | Schulz | |
| 5,249,364 A | 10/1993 | Bishop | |
| 5,268,731 A | 12/1993 | Fuchiwaki et al. | |
| 5,274,433 A | 12/1993 | Madey et al. | |
| 5,291,264 A | 3/1994 | Longa et al. | |
| 5,519,489 A | 5/1996 | McClenahan et al. | |
| 5,532,816 A | 7/1996 | Spann et al. | |
| 5,583,797 A | 12/1996 | Fluegge et al. | |
| 5,675,408 A | 10/1997 | Samuelsson et al. | |
| 5,703,796 A | 12/1997 | Moradi et al. | |
| 5,724,129 A | 3/1998 | Matteucci | |
| 5,724,743 A | 3/1998 | Jackson | |
| 5,731,870 A * | 3/1998 | Bartko et al. | 356/139.09 |
| 5,781,286 A | 7/1998 | Knestel | |
| 5,812,256 A | 9/1998 | Chapin et al. | |
| 5,815,257 A | 9/1998 | Haas | |
| 5,818,574 A | 10/1998 | Jones et al. | |
| 5,870,315 A | 2/1999 | January | |
| 5,930,881 A | 8/1999 | Naruse et al. | |
| 5,978,077 A | 11/1999 | Koerner et al. | |
| 6,100,923 A | 8/2000 | Sass et al. | |
| 6,148,528 A | 11/2000 | Jackson | |
| 6,400,451 B1 * | 6/2002 | Fukuda et al. | 356/139.09 |
| 6,404,486 B1 | 6/2002 | Nobis et al. | |
| 6,412,183 B1 | 7/2002 | Uno | |
| 6,424,411 B1 | 7/2002 | Rapidel et al. | |
| 6,456,372 B1 | 9/2002 | Hudy | |
| 6,473,978 B1 | 11/2002 | Maas | |
| 6,532,673 B2 | 3/2003 | Jahn et al. | |
| 6,545,750 B2 | 4/2003 | Roth et al. | |
| 6,559,936 B1 | 5/2003 | Colombo et al. | |
| 6,657,711 B1 | 12/2003 | Kitagawa et al. | |
| 6,690,456 B2 | 2/2004 | Bux et al. | |
| 6,707,557 B2 * | 3/2004 | Young et al. | 356/444 |
| 6,714,291 B2 | 3/2004 | Castagnoli et al. | |
| 6,731,382 B2 | 5/2004 | Jackson et al. | |
| 6,744,497 B2 | 6/2004 | Burns, Jr. | |
| 6,748,796 B1 | 6/2004 | Van Den Bossche | |
| 6,796,035 B2 | 9/2004 | Jahn et al. | |
| 6,802,130 B2 | 10/2004 | Podbielski et al. | |
| 6,836,970 B2 | 1/2005 | Hirano | |
| 6,879,403 B2 | 4/2005 | Freifeld | |
| 7,230,694 B2 | 6/2007 | Forster et al. | |
| 2009/0046279 A1 | 2/2009 | Tentrup et al. | |

FOREIGN PATENT DOCUMENTS

| | | |
|---|---|---|
| EP | 0593066 A1 | 10/1993 |
| EP | 0593067 A1 | 10/1993 |
| EP | 0994329 A1 | 10/1998 |
| EP | 1221584 A1 | 1/2001 |
| EP | 1505363 A1 | 7/2004 |
| FR | 2808082 A1 | 10/2001 |
| WO | 0071972 A1 | 11/2000 |
| WO | 2008014783 A1 | 2/2008 |

OTHER PUBLICATIONS

Written Opinion of the International Searching Authority of corresponding PCT application No. PCT/US08/62424.

ISRA Vision Systems Press Release, No. 97, May 16, 2006 "Mounting Wheels Automatically on Moving Car Bodies.".

Dürr Factory Assembly Systems (FAS) materials, Dr. Thomas Tentrup, believed to be dated Sep. 2006, with partial translation of pp. 12-14.

Extended European Search Report transmitted Mar. 26, 2010, from corresponding European Application No. EP 08 74 7507, enclosing Supplementary European Search Report indicated to have been completed on Mar. 17, 2010.

* cited by examiner

NON CONTACT WHEEL ALIGNMENT SENSOR AND METHOD

CROSS REFERENCE TO RELATED APPLICATION

The present application claims priority of U.S. provisional application Ser. No. 60/916,004 filed May 4, 2007, by De Sloovere et al. for NON CONTACT WHEEL ALIGNMENT SENSOR, which is hereby incorporated herein by reference in its entirety.

FIELD OF THE INVENTION

This invention relates to a measurement apparatus for determining the orientation of a three-dimensional object with respect to a reference system, and more particularly, to a measurement system comprising one or more sensors especially adapted for use with vehicle wheels using light beams projected onto a tire and wheel assembly to define a plane of orientation of the wheel with respect to a predetermined orientation.

BACKGROUND OF THE INVENTION

In the automotive industry, proper vehicle quality requires measurement and adjustment of wheel alignment settings, both during manufacture and subsequently during the useful life of the vehicle. Proper positioning and alignment of vehicle wheels, and especially steerable wheels such as the front wheels of a vehicle, requires the setting of toe, camber angle, and caster angle. Toe is the angle between the vehicle's longitudinal axis and a plane through the center of the wheel/tire and affects the straight-ahead running of the vehicle as well as steering. Camber angle is the inclination of the wheel axis toward the road surface in a vertical plane and is negative when the top of the wheel is inclined toward the center of the vehicle. Caster angle is the tilt of the steering axis parallel to the direction of the vehicle centerline. A tilt toward the rear of the vehicle results in a positive caster angle. During assembly and/or repair of vehicles, it is important to measure, adjust or audit, and set the toe as well as the camber and caster angles of vehicle wheels, and especially steerable wheels, so the vehicle will drive and steer properly.

In the past, various methods have been used to measure toe and camber of vehicle wheels including direct and indirect methods. Direct measurement methods require human operators or mechanisms to place measurement tools in contact with the vehicle and are subject to placement error and wear. Indirect measurement methods, sometimes referred to as noncontact methods, typically include the viewing or sensing of the image of light projected on a tire when mounted on a vehicle and the use of a computer to calculate the tire position from such images to provide the ultimate alignment information. The prior known direct measurement methods were cumbersome, time-consuming, often labor-intensive, and less accurate than desired. Prior non-contact or indirect methods involve projecting one or two light beams at discrete locations on a tire, and receiving and processing reflected images of the light beams from the tire to reconstruct the wheel/tire plane.

Therefore, a need was determined for an apparatus and method for measuring and determining the orientation of a vehicle wheel and, more broadly, any three-dimensional object, which would allow determination of the plane of the wheel or object in a more accurate and robust manner to indicate the position of the wheel/tire with respect to the vehicle center line for purposes of setting the toe and/or camber of the wheel/tire for alignment purposes.

SUMMARY OF THE INVENTION

Accordingly, the present invention provides an apparatus and method for determining the orientation of a three-dimensional object and, which in the preferred form is a tire and wheel assembly for which alignment characteristics are desired. The sensors project multiple light beams at a tire and wheel assembly to form multiple generally parallel and horizontal illumination images. Reflected images of some or all of the illumination lines are then received by the sensors. The multiple illumination lines that are projected onto the tire and the position of those lines in the acquired image enable the three dimensional spatial orientation or geometry of the wheel to be calculated.

According to an aspect of the present invention, a method of determining alignment characteristics of a tire and wheel assembly mounted on a vehicle comprises projecting a plurality of light planes from a first light projector onto a tire and wheel assembly to form a plurality of generally parallel illumination lines on a tire of the tire and wheel assembly, receiving a reflected image of at least some of the illumination lines with a photo electric device reflected from the tire at an angle relative to a projecting angle of the first light projector, and determining a plane defined by spatial coordinates from a selected point located on each illumination line imaged by the photo electric device, with the plane representing the orientation of the tire and wheel assembly.

The plurality of light planes projected from the first light projector may be divergently projected. Reflecting devices may be used to project the plurality of light planes and/or to direct the reflected images at the photo electric device. The plurality of light planes may be projected onto only one side of the tire relative to the wheel, or may be simultaneously projected about or on diametrically opposed portions of the tire about the wheel. The photo electric device may repeatedly image that portion of the reflected illumination lines while the tire and wheel assembly is rotating. In which case, for example, the plane may be recalculated for each frame and averaged, or the spatial coordinates of the selected point on each illumination line may be averaged over the repeated frame images to define the plane.

The method of determining alignment characteristics may also include projecting a single light plane from a second light projector onto the tire and wheel assembly to form a single reference illumination line on the tire of the tire and wheel assembly, receiving a reflected image of the reference illumination line from the tire with the photo electric device, and determining a reference distance from the reference illumination line to a noncontact wheel alignment sensor including the first and second light projectors and the photo electric device. With the method further comprising identifying which illumination lines are imaged at the step of receiving a reflected image using the reference distance. According to this aspect, the second light projector is angularly oriented relative to the first light projector.

The method of determining alignment characteristics may still further comprise resolving three dimensional spatial coordinates for multiple points located on each illumination line imaged by the photo electric device and deriving a best fit curve equation for each illumination line, including determining the plane as a best fit tangential plane to the derived curve equations. The method may further include determining a reference point on each illumination line that is closest to a reference plane and subsequently determining a first plane as a best fit plane to the reference points from each illumination line. The method further iteratively determines a plane by first determining the selected point located on each illumination line that is closest to the previously determined plane and then determining a new plane as a best fit plane to the selected point located on each illumination line that is closest to the newly determined plane.

Still further, the method may comprise projecting a plurality of light planes from another light projector onto the tire and wheel assembly to form a plurality of generally parallel second illumination lines on the tire. The illumination lines from the first light projector are spaced from the second illumination lines from the other light projector and a reflected image received by a photo electric device includes at least one illumination line formed by the first light projector and at least one illumination line formed by the other light projector.

According to another aspect of the present invention, a method of determining alignment characteristics of a tire and wheel assembly mounted on a vehicle comprises providing a first noncontact wheel alignment sensor and a second noncontact wheel alignment sensor positioned about a wheel of a tire and wheel assembly, each sensor including a multiline light projector and a camera device. Projecting a plurality of light planes from the multiline light projectors of the first and second sensor onto the tire and wheel assembly to form a plurality of generally parallel illumination lines on a first and a second tire portion, and receiving a reflected image of at least some of the illumination lines from the first tire portion with the camera device of the first sensor and receiving a reflected image of at least some of the illumination lines from the second tire portion with the camera device of the second sensor at angularly offset orientations relative to the multiline light projectors. The method further comprising determining a plane defined by spatial coordinates from a selected point located on each illumination line imaged by the camera devices of the first and second sensors, with the plane representing the orientation of the tire and wheel assembly.

The multiline light projectors of the first and second sensors may divergently project the light planes. Each sensor may also include a single line reference projector, with the method further comprising projecting a single light plane from both single line reference projectors onto the tire and wheel assembly to form a single reference illumination line on the first and second tire portions. The method further includes receiving a reflected image of the single reference illumination lines with the camera devices and determining a reference distance from the single reference illumination line on the first tire portion to the first sensor, and determining a reference distance from the single reference illumination line on the second tire portion to the second sensor. The method may further include repeatedly receiving reflected images with the camera devices of the first and second sensors while the tire and wheel assembly is rotating.

According to another aspect of the present invention, a noncontact wheel alignment sensor for determining alignment characteristics of a tire and wheel assembly mounted on a vehicle includes a first multiline light projector, a camera device, and a processor. The first multiline light projector projects a plurality of light planes onto the tire and wheel assembly to form generally parallel illumination lines on the tire. The camera device receives reflected images of at least some of the illumination lines reflected from the tire at an offset angle relative to a projecting angle of the first multiline light projector. The processor determines a plane defined by spatial coordinates from a selected point located on each illumination line imaged by the camera device, with the plane representing the orientation of the tire and wheel assembly.

According to an aspect of the invention, the multiline light projector may divergently project the plurality of light planes. The sensor may also include a single line reference light projector that projects a single light plane onto the tire and wheel assembly to form a reference illumination line on the tire, with the single line reference light projector being oriented to project at an angle offset from said first multiline light projector. The noncontact wheel alignment sensor may optionally include a second multiline light projector that projects a second plurality of light planes onto the tire and wheel assembly to form a second set of generally parallel illumination lines on the tire. The illumination lines formed by the first multiline light projector are selectively spaced on the tire from the second set of generally parallel illumination lines formed by the second multiline light projector. The sensor may also optionally include reflecting devices to project the light planes toward the tire and/or to reflect images toward the camera device.

The present invention provides significant advantages over prior known apparatus and methods for measuring and calculating the orientation of three dimensional objects such as vehicle wheels for alignment purposes. The non-contact sensors of the present invention project multiple illumination lines onto an object, such as a tire of a tire and wheel assembly, as well as receive reflected images of the illumination lines. From the reflected images, the sensors determine three dimensional spatial coordinates of selected points of the illumination lines on the tire and determine a plane through the determined three dimensional spatial coordinates, which plane represents the orientation of the tire and wheel assembly and from which toe and camber may be calculated, as well as other alignment characteristics. The projection of multiple illumination lines provides an increased number of measuring points and, thus, greater precision in determining the tire and wheel assembly orientation, as well as increases the working field over which the sensor may operate. The projection of multiple light planes also enables the projection angle of the light planes or the viewing angle of the illumination lines on the tire and wheel assembly by the sensor to be increased, which in turn enhances the sensitivity of the sensors. Tire and wheel assembly orientation may be calculated for each illumination line imaged by the sensor, thereby providing redundancy, robustness, and enabling noise reduction. Still further, due to the generally torid shape of tires and the associated determined high points of the illumination lines projected onto the tire sidewall surface, a single image may be used to calculate camber, toe angle, and wheel center position.

These and other objects, advantages, purposes and features of this invention will become apparent upon review of the following specification in conjunction with the drawings.

DESCRIPTION OF THE PREFERRED EMBODIMENTS

Figure 1:
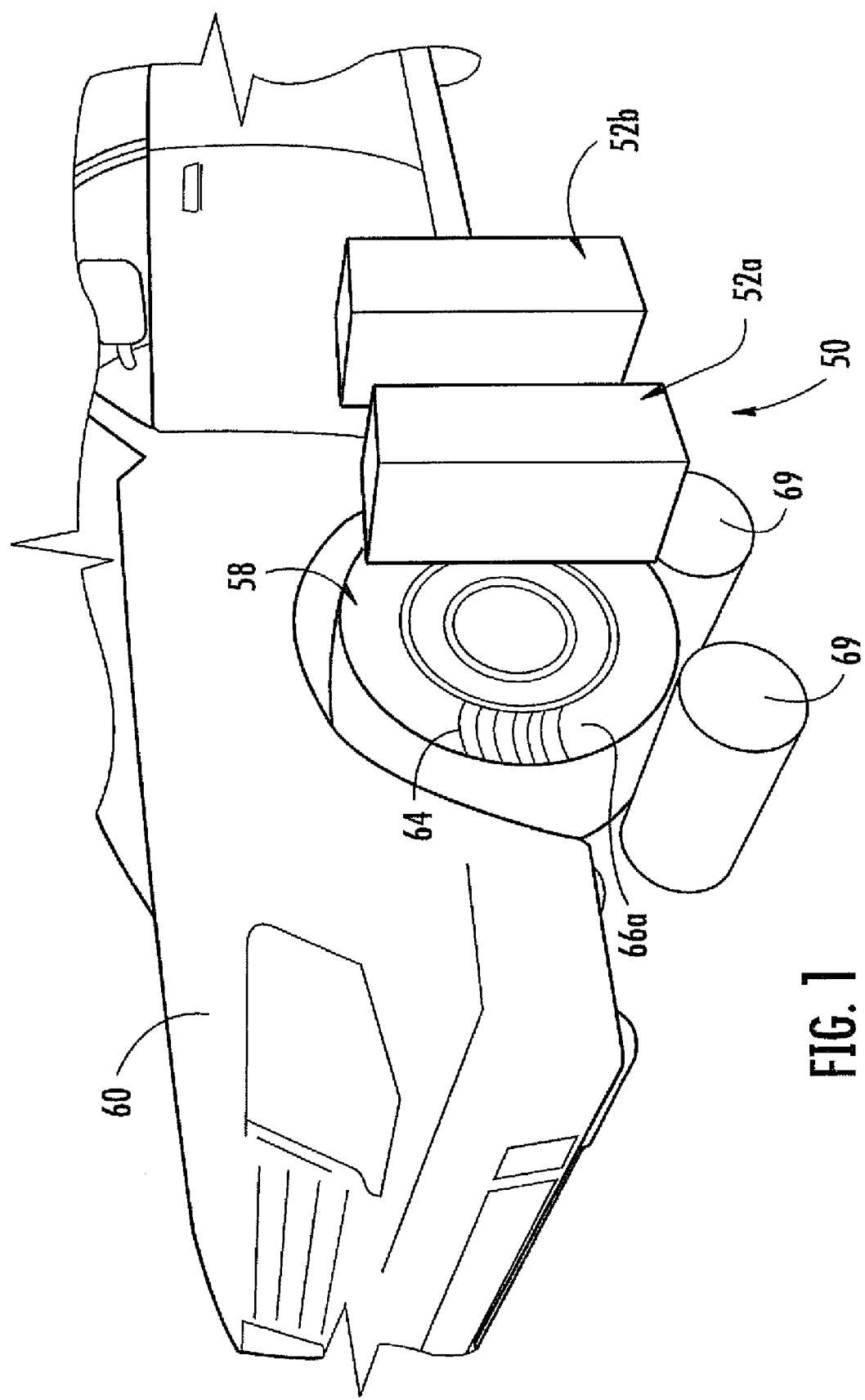
FIG. 1 is a perspective view of a pair of sensors in accordance with the present invention adjacent a tire and wheel assembly of a vehicle.
Figure 2:
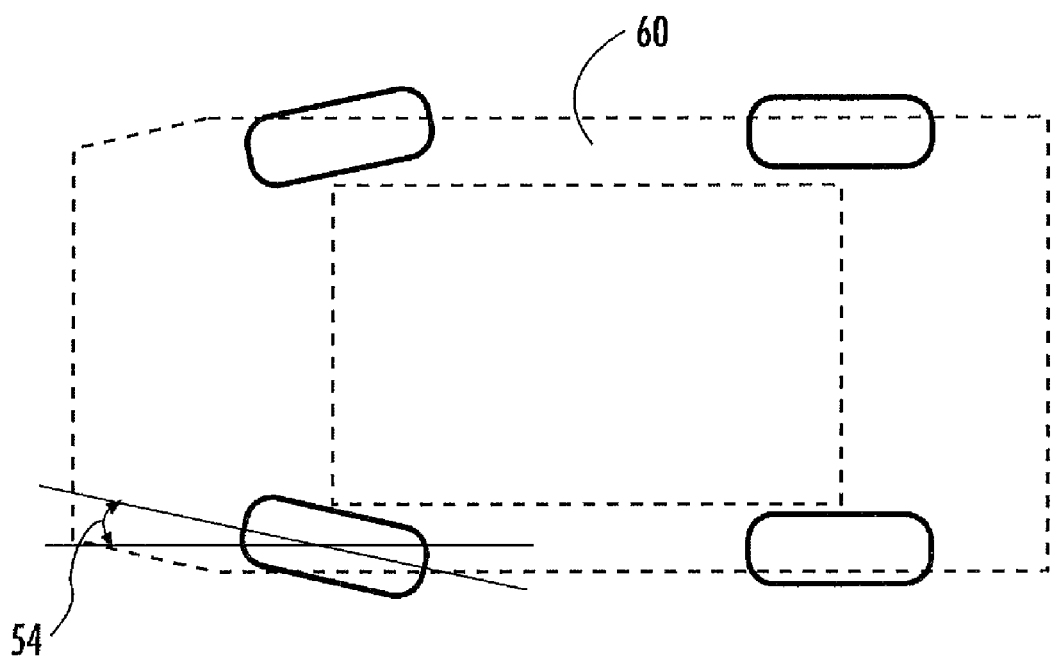
FIG. 2 is an illustration of the toe angle of a tire and wheel assembly of a vehicle.
Figure 3:
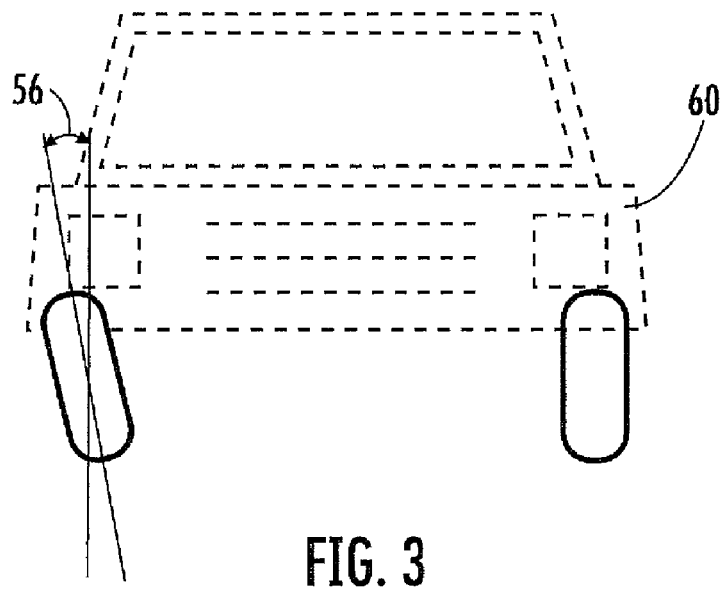
FIG. 3 is an illustration of the camber angle of a tire and wheel assembly of a vehicle.

The present invention will now be described with reference to the accompanying figures, wherein the numbered elements in the following written description correspond to like-numbered elements in the figures. A measurement system or apparatus 50, which in the illustrated embodiment of FIG. 1, comprises a pair of non-contact wheel alignment sensors 52a, 52b is used for determining wheel alignment characteristics such as toe, camber, caster, steering axis inclination (SAI), as well as the wheel center, axis of symmetry, and rear thrust angle. FIG. 2 illustrates the toe angle 54 to be determined and FIG. 3 illustrates the camber angle 56 to be determined. Although only one tire and wheel assembly 50 is illustrated in FIG. 1, it should be understood that a measurement system comprising two sensors 52a, 52b may be placed at either of the front or rear tire and wheel assemblies or at each of the four tire and wheel assemblies of vehicle 60. Alternatively, a single sensor 52 may be used at each tire and wheel assembly.

Figure 12:
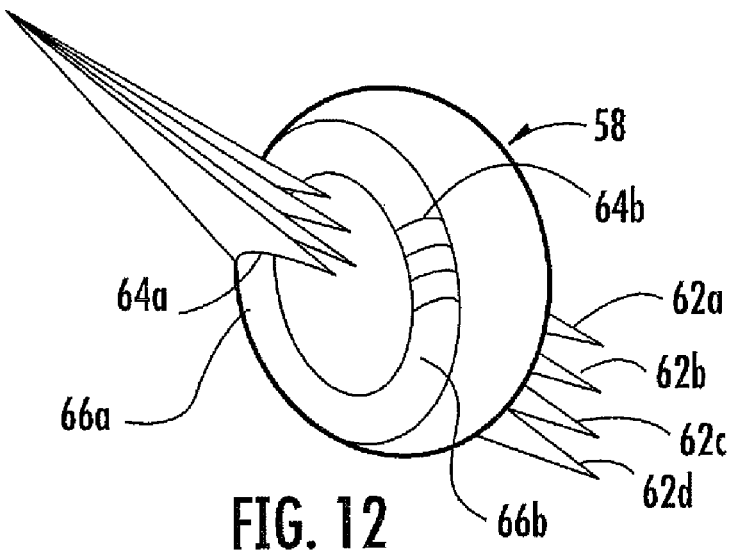
FIG. 12 is a perspective view of a tire and wheel assembly illustrating the projection of light planes from a light projector (not shown) onto a tire and wheel assembly to form illumination lines.
Figure 13:
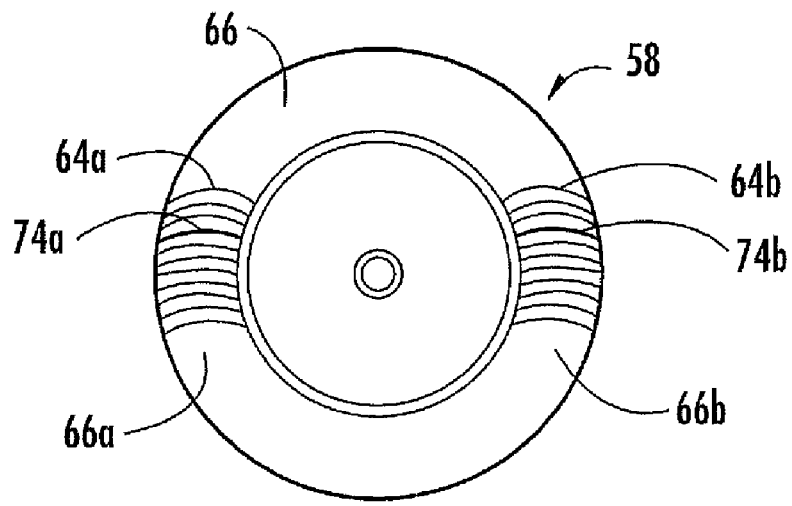
FIG. 13 is a front elevation view of a tire and wheel assembly illustrating illumination lines projected onto the left and right side portions of the tire.

As described in more detail below, each sensor 52, with reference to FIGS. 4-6, projects multiple light beams, which in the illustrated embodiment comprise planes of light or light planes 62 (62a-62d FIG. 12) projected at a tire and wheel assembly 58 mounted to a vehicle 60 to form or generate multiple generally parallel and horizontal illumination images on the tire sidewall, which are illustrated as illumination lines 64 (FIGS. 1 and 13) on both the left and right side of the tire 66, with one sensor 52a projecting at the left side 66a and the other sensor 52b projecting at the right side 66b (FIGS. 1 and 13). FIG. 12 discloses that light planes 62 are divergently projected. Alternatively, the light planes may be projected in a parallel manner. Although only a limited number are illustrated, each sensor 52 may form approximately fifteen illumination lines 64 on tire 66. Reflected images (not shown) of some or all of the illumination lines 64 are then received by the sensors 52, such as between approximately ten to twelve illumination lines. The multiple illumination lines 64 projected onto the tire 66 and the position of those lines 64 in the acquired image enable the three dimensional spatial orientation or geometry of the wheel 58 to be calculated throughout the working area of the sensor 52 based on the sensors 52 field and depth of view.

Sensor processors 68 (FIG. 4) are used to analyze the reflected images received by sensor 52 from within the field of view of sensor 52 and, based on the calibration of sensors 52, derive data indicative of the wheel and tire assembly 58 orientation. In one embodiment, processors 68 derive equations representing each illumination line 64 and correlate selected points of the images to three dimensional spatial values. The selected points for deriving into three dimensional spatial values may be selected as the high points of the illumination lines. Tire sidewalls are naturally bulged such that illumination lines 64 form curves thereon with the high point of such a curved line intended to represent or be located at the physical high point of the tire sidewall along the length of the illumination line 64. The processors 68 may then further determine or fit a plane to the determined high points, with the determined plane being representative of the toe and camber orientation of the tire and wheel assembly 58.

Alternatively, processors 68 may determine three dimensional spatial coordinates for multiple points along each illumination line 64 within the field of view of sensor 52 and derive a curved line equation for each illumination line 64, such as by fitting curves to the illumination lines 64 based on the three dimensional spatial coordinates for each line. A plane tangential to the determined curved line equations represents the toe and camber orientation of the tire and wheel assembly 58 and intersects with the high points of the illumination lines 64. As such, processors 68 may also determine the three dimensional spatial coordinates of the high points of the viewed illumination lines 64 based on the intersection of the determined tangential plane with the determined curved line equations.

Pre-recorded calibration sets, such as described below, may be used to perform the transfer of curve parameters to three dimensional coordinates. Due to the necessarily concentric orientation of the three dimensional spatial high point coordinates, the determined high points define a circle in three dimensions representative of the tire mounted to the wheel. Processors 68 may then further determine the center of the wheel based on a determination of the center point of the determined circle defined by the three dimensional high points of the illumination lines 64. Based on the determined wheel center point further parameters, such as wheel axle geometry parameters may also then be determined. As understood from FIG. 1, wheel assembly 58 may be positioned on rollers 69 that operate to rotate wheel assembly 58 during measurement. Alternatively, however, measurements may be performed under static conditions of wheel assembly 58.

The projection and receiving of multiple light planes 62 provides several advantages in the determination of wheel alignment characteristics, including adding greater precision and enlarging the possible working volume of sensor 52 with respect to the field of view and depth of sensor 52. For example, the projection of multiple illumination lines 64 over the left and right tire areas 66a, 66b provides a larger number of measuring points. In addition, the angles made between the projected illumination lines 64 and the sensor 52 view can be kept larger than with other methods that project fewer lines, such as a single line, and the sensitivity is therefore enhanced. Further, the wheel 58 positioning can be calculated for each of the projected illumination lines 64 seen by the sensor 52, thereby providing redundancy, and consequently robustness and noise reduction. Additionally, when the distance between the wheel 58 and sensor 52 is increased, some illumination lines 64 disappear from the field of view, but others enter, thereby keeping functionality over larger depths. Still further, the processing of a single image from sensor 52 can extract enough information to calculate camber angle. Moreover, albeit with lower accuracy, a single image also contains information to extract wheel center position, and toe angle.

Figure 4:
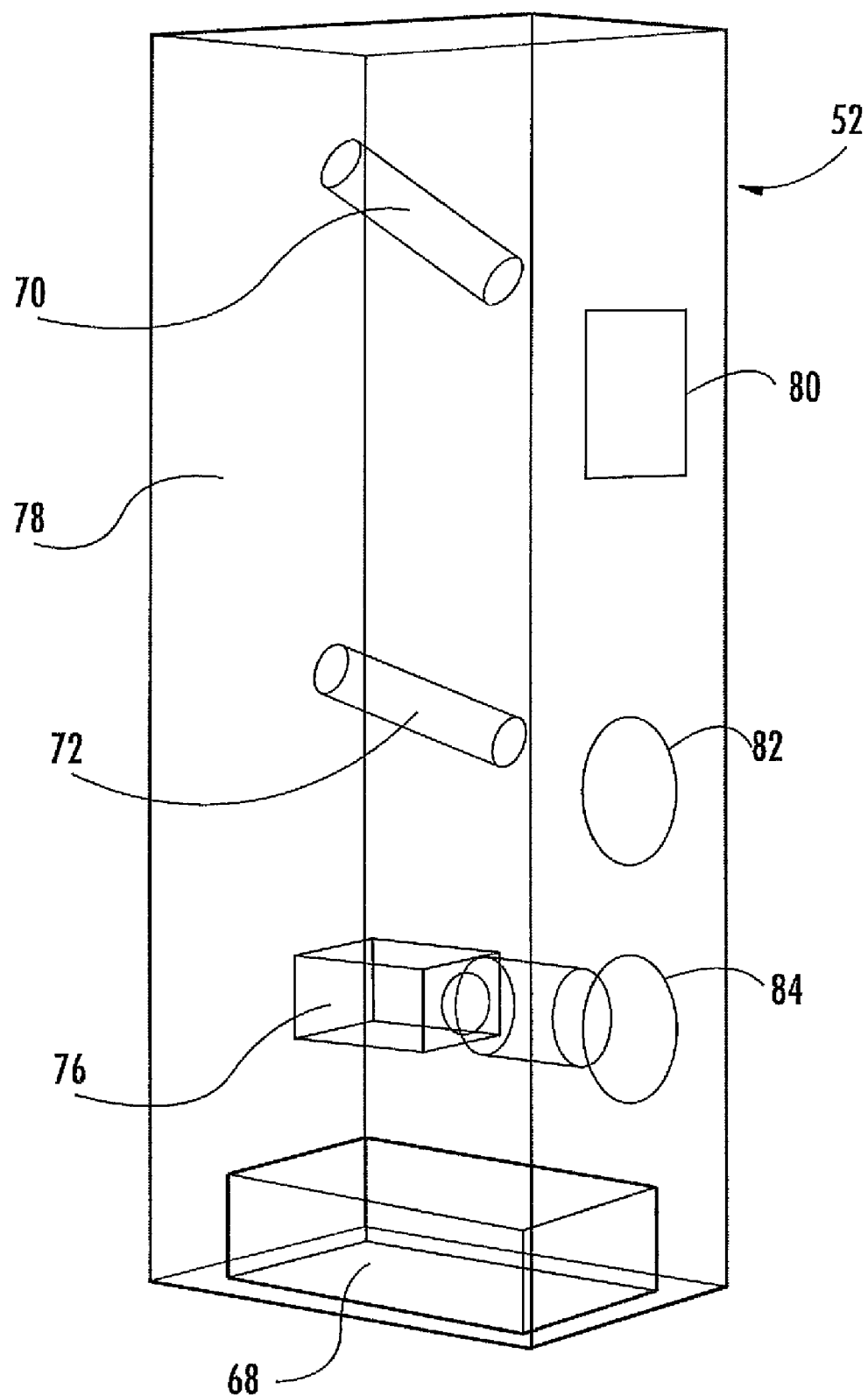
FIG. 4 is a schematic perspective illustration of a sensor in accordance with the present invention showing the location and orientation of internal components of the sensor.

Referring now to the embodiment of FIG. 4, each sensor 52 is shown to include a multiline light projector or source or first or upper light projector 70. Each sensor also includes a reference light projector or source or second or lower light projector 72 positioned beneath light projector 70. Reference light projector 72 projects a reference light plane (such as shown at 265 in FIG. 9) to generate a reference illumination line 74 on tire 66 (FIG. 13). As described in more detail below, reference light projector 72 may be used in evaluating, determining or establishing which of illumination lines 64 reflected from a tire 66 are being received by sensor 52, including the location or orientation of the reflected illumination lines 64 within sensor 52. In the illustrated embodiment, light projector 70 and reference light projector 72 are lasers capable of projecting shaped laser light, with light projector 70 being adapted to project multiple planes of light and reference light projector 72 adapted to project a single plane of light.

Sensors 52 further include an image capture device or photo electric device or digital camera device 76 and a processor 68. Camera device 76 may comprise or include a charged coupled device (CCD) or complementary metal-oxide-semiconductor (CMOS) sensor for receiving the reflected images of illumination lines 64 and converting the images into pixels for analysis by processor 68. Camera device 76 may have a resolution of one megapixel, but may be greater or smaller as desired or required. Camera device 76 may also include a narrow band filter that only permits light to pass into camera 76 having wavelengths approximately equivalent to the wavelengths of light output by light projector 70 and reference light projector 72. Processor 68 is shown as a separate component in FIG. 4, however, camera device 76 may include processing capability, such as by a CPU, and/or a separate processing system located externally from the housing 78 of sensor 52 may be utilized to perform mathematical processing.

Figure 17:
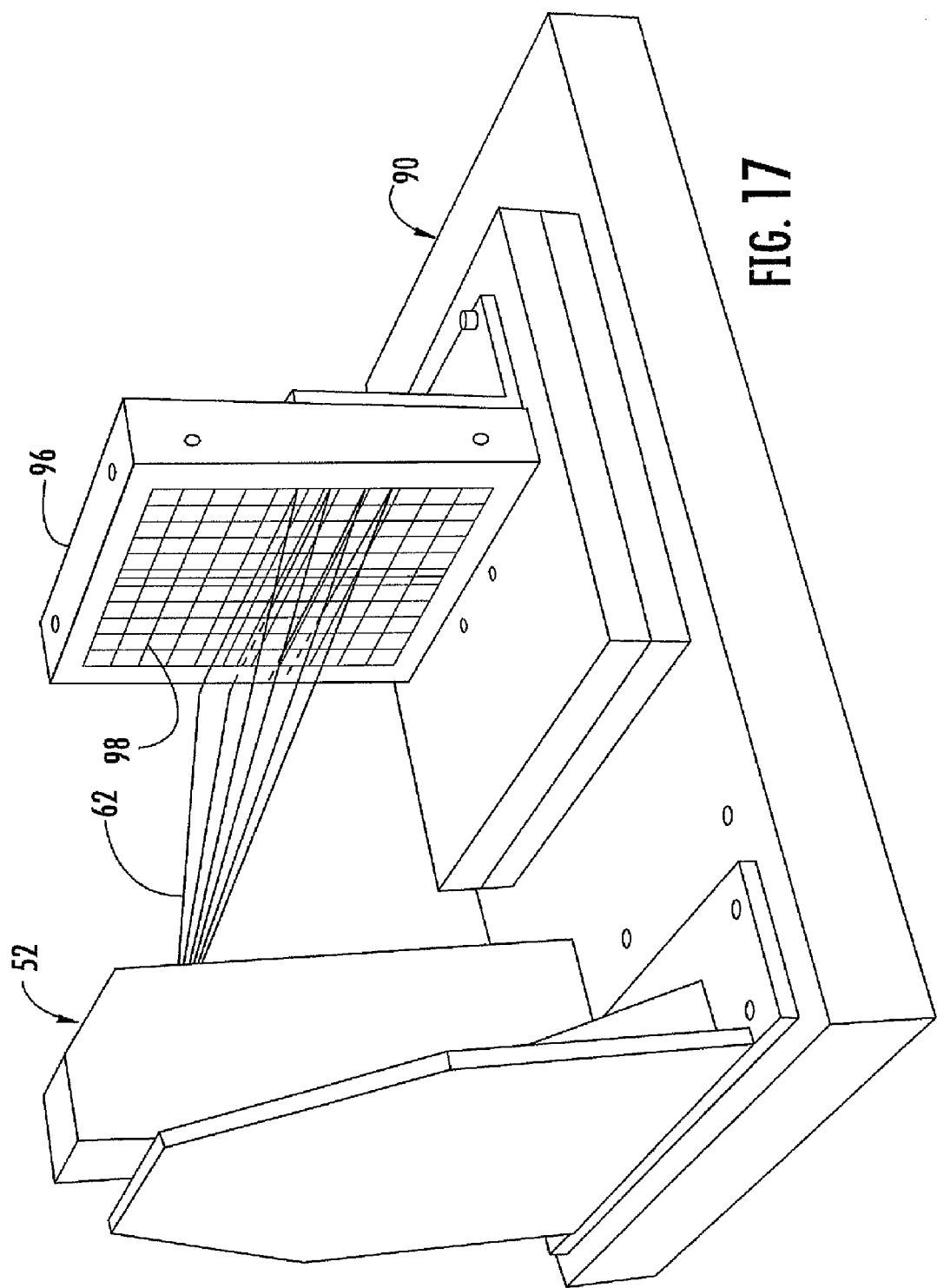
FIG. 17 is a perspective views of a sensor in accordance with the present invention mounted to a vehicle test bed with a calibration block positioned on the test bed for calibrating the sensor.

As illustrated in FIG. 4, light projector 70, reference light projector 72, camera device 76, and processor 68 are mounted within housing 78. As understood from FIG. 4, light projector 70 projects light planes 62 through window 80 and reference light projector 72 projects through window 82. Images of illumination lines 64 and reference illumination line 74 are reflected back to camera 76 through window 84. Referring now to FIGS. 5 and 6, light projector 70, reference light projector 72, and photo electric device 76 are shown mounted to frame 86, which are mounted within housing 78 and in turn may be mounted to a plate, bracket, part of a system incorporating sensor 52, or the like. Sensor 52 may be mounted to a test bed 90 (FIG. 17), with test bed 90 being used for locating and testing a vehicle 60 for measuring wheel alignment characteristics. Referring again to the embodiment of FIG. 4, camera device 76 is mounted generally orthogonally within housing 78 relative to the long axis of the housing 78 such that, in use, camera device 76 is directed generally perpendicularly toward the tire and wheel assembly 58.

Figure 5:
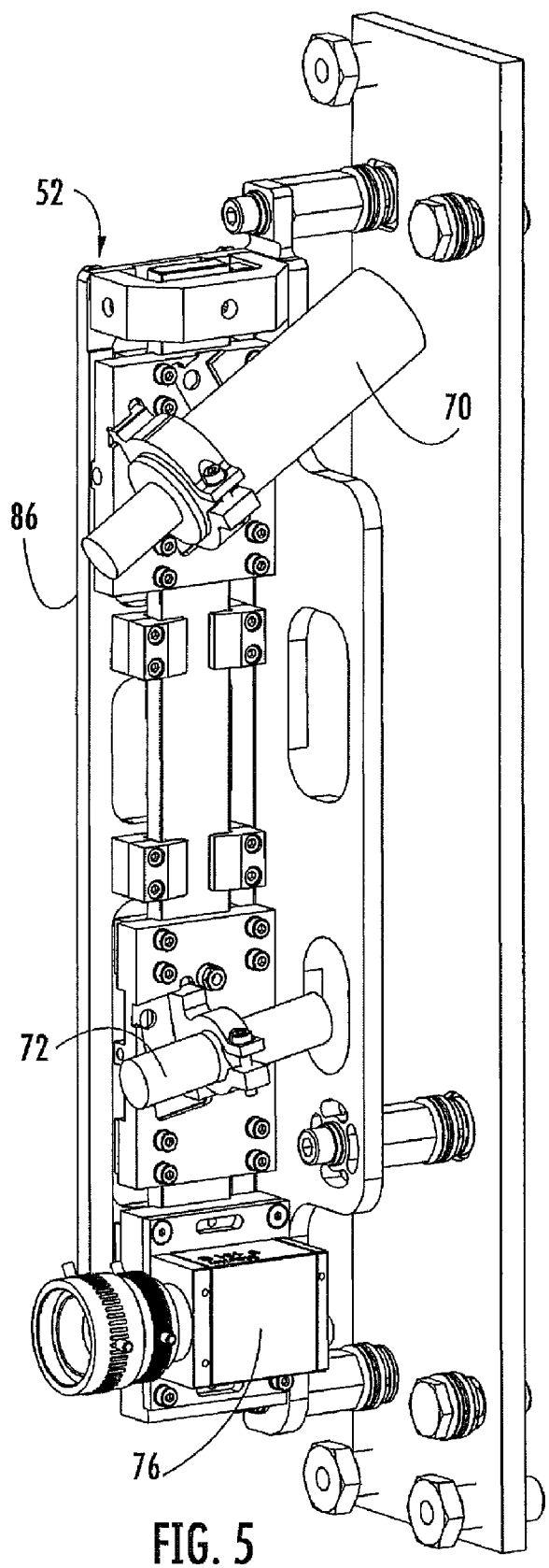
FIG. 5 is a perspective view of the sensor of FIG. 4 with a housing cover removed to illustrate the internal light projector, reference light projector, and camera device.
Figure 6:
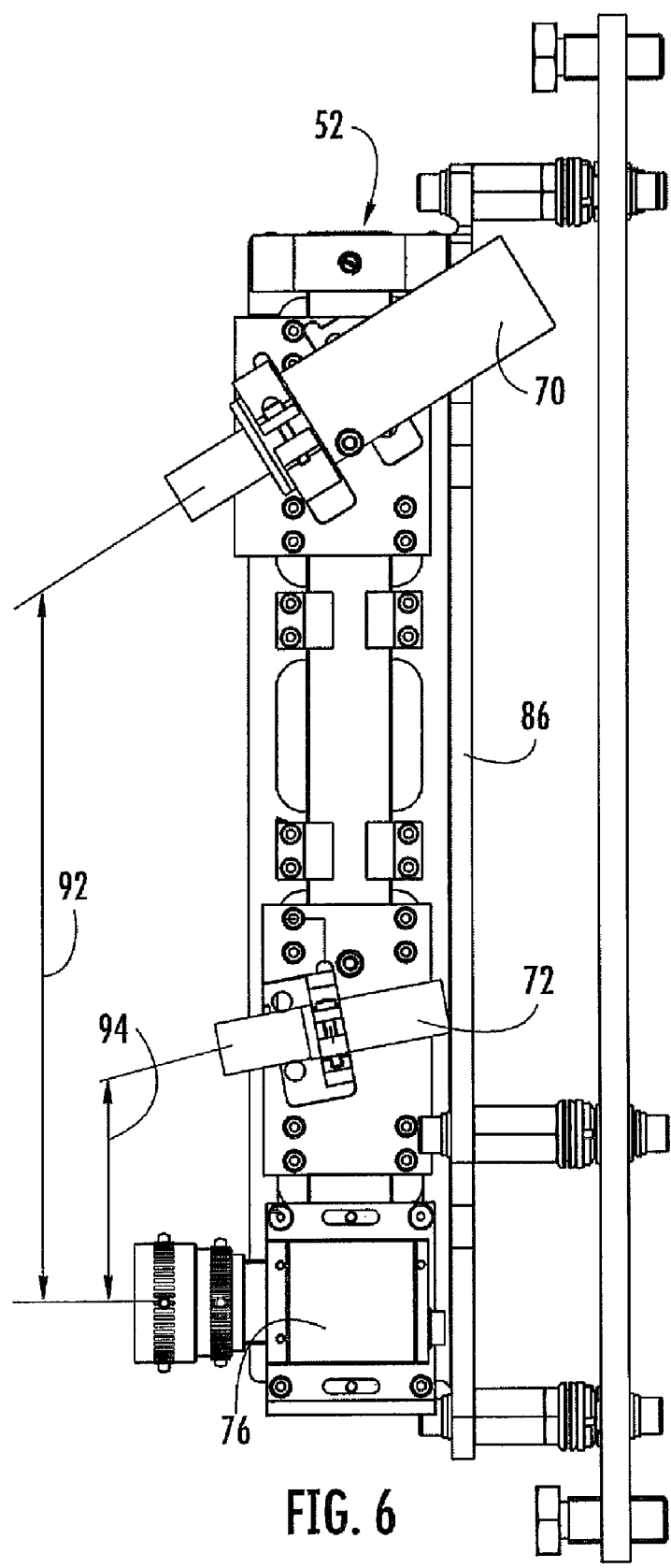
FIG. 6 is a side elevation view of the sensor assembly of FIG. 5.

As understood from FIGS. 4-6, light projector 70 is mounted such that it is directed at an acute angle with respect to the viewing direction of camera device 76, with angle 92 being approximately 30 degrees. Similarly, reference light projector 72 is mounted at a smaller acute angle relative to camera device 76, with angle 94 being approximately 10 degrees. As previously noted, light projector 70 projects multiple light planes 62 at tire and wheel assembly 58, while reference light projector 72 projects a single plane of light. It should be appreciated that, due to the greater angle of orientation, in some instances not all of the projected planes of light 62 from light projector 70 will be viewable by camera device 76, such as when sensor 52 is located relatively close to or far from tire and wheel assembly 58. In contrast, due to the shallower angle of angle 94 relative to angle 92, the reference illumination line 74 projected onto tire 66 by reference light projector 72 will be viewable by camera device 76 throughout the working position or distance of sensor 52 relative to tire and wheel assembly 58.

Alternative arrangements for sensors may be employed within the scope of the present invention. For example, the camera device may be angled either upwardly or downwardly with respect to the sensor housing and/or tire and wheel assembly. In such an arrangement the camera may also view the tire and wheel assembly via a reflector or reflecting device, such as a mirror, that is angled to reflect images toward the camera. Similarly, the light projector and/or reference light projector may project images onto a mirror, which in turn projects or reflects the images onto the tire and wheel assembly.

Figure 7:
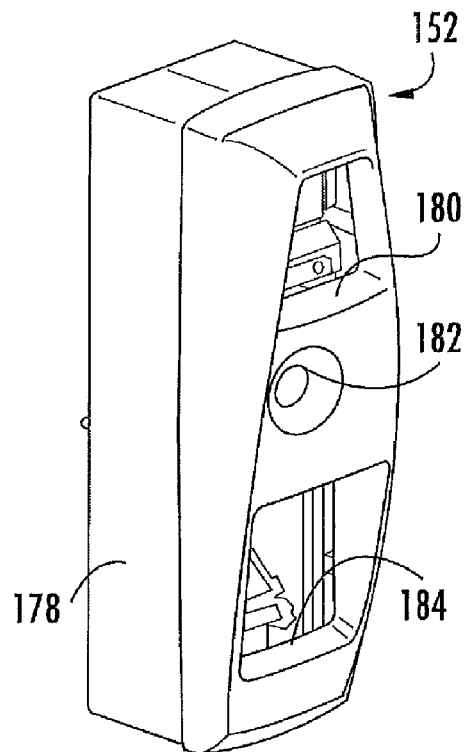
FIG. 7 is a perspective view of another sensor in accordance with the present invention.
Figure 8A:
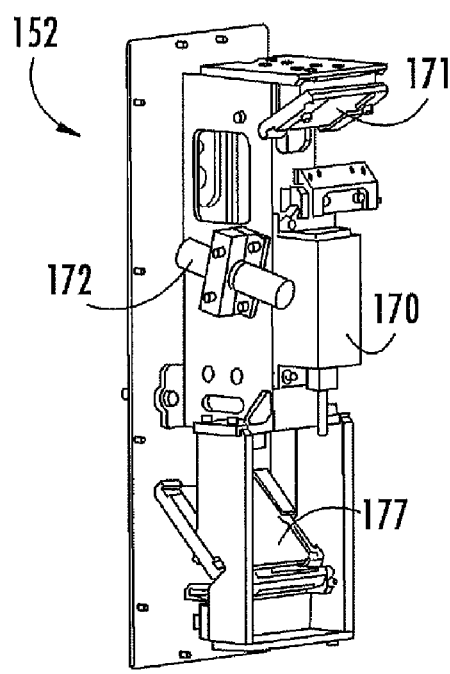
FIG. 8A is a perspective view of the sensor of FIG. 7 with a housing cover removed to illustrate the internal light projector, reference light projector, camera device, and reflective members.
Figure 8B:
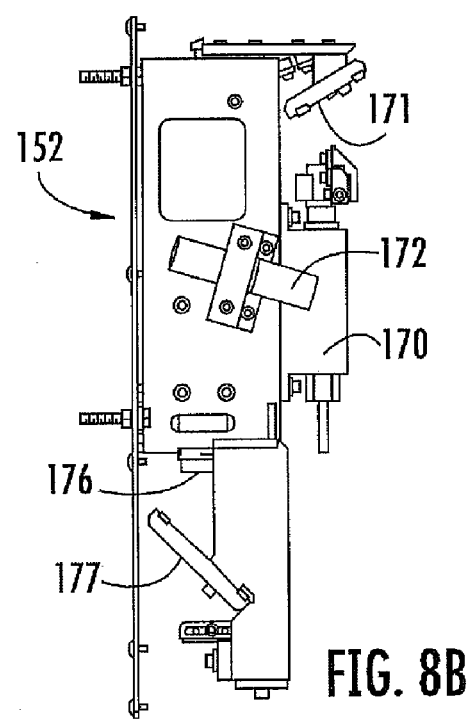
FIG. 8B is a side elevation view of the sensor assembly of FIG. 7.

An example of such an alternative sensor is illustrated as sensor 152 in FIGS. 7-8C. It should be appreciated that sensor 152 is of generally like construction as sensor 52 with the common or similar components or elements of sensor 152 being shown with similar reference numbers as used in FIGS. 4-6 with respect to sensor 52, but with the reference numeral "100" added to the reference numbers of FIGS. 4-6. It should be understood that, because of the similarity of sensor 152 to sensor 52, not all of the specific construction and alternatives of like referenced parts will be discussed.

Sensor 152 includes a light projector 170, reference light projector 172, and camera device 176. Light projector 170 projects images generally vertically upward toward and off of light projector reflector or reflector device 171, which in the illustrated embodiment is formed as a mirror. Those images are, in turn, reflected out of window 180 of housing 178. Reference light projector 172, which is oriented in generally the same manner as reference light projector 72 of sensor 52 and projects out of window 184; Camera device 176 is directed generally vertically downwardly to receive images reflected from the tire and wheel assembly onto and upward from camera reflector or reflector device 177, which in the illustrated embodiment is also a mirror.

Figure 9:
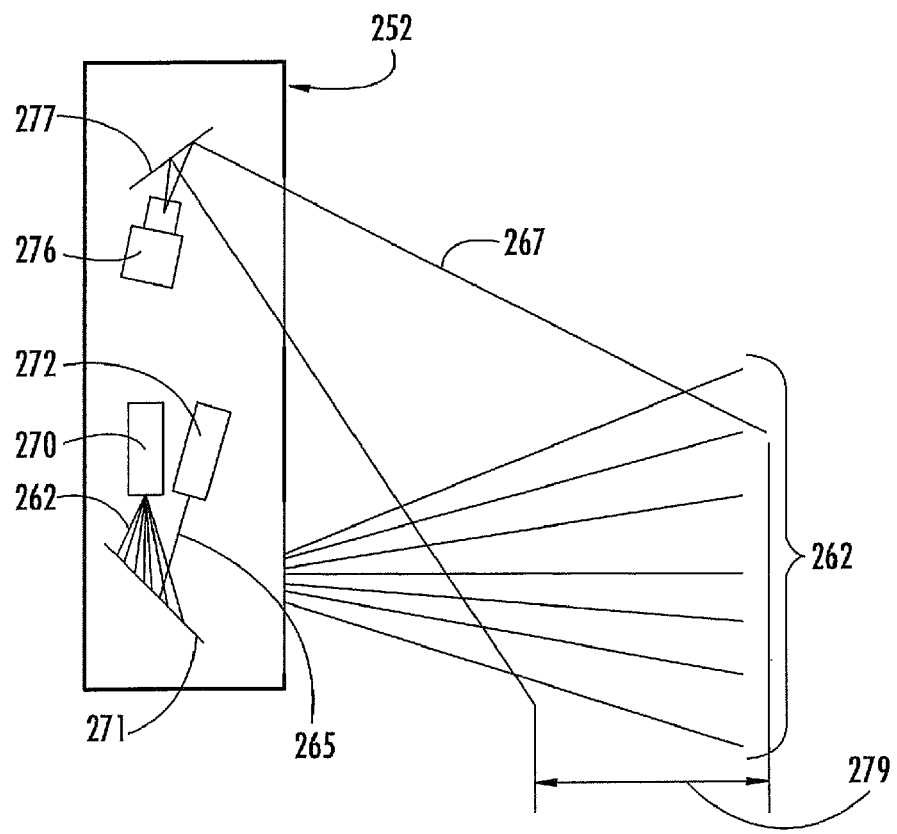
FIG. 9 is a side elevation view of another sensor in accordance with the present invention.
Figure 10:
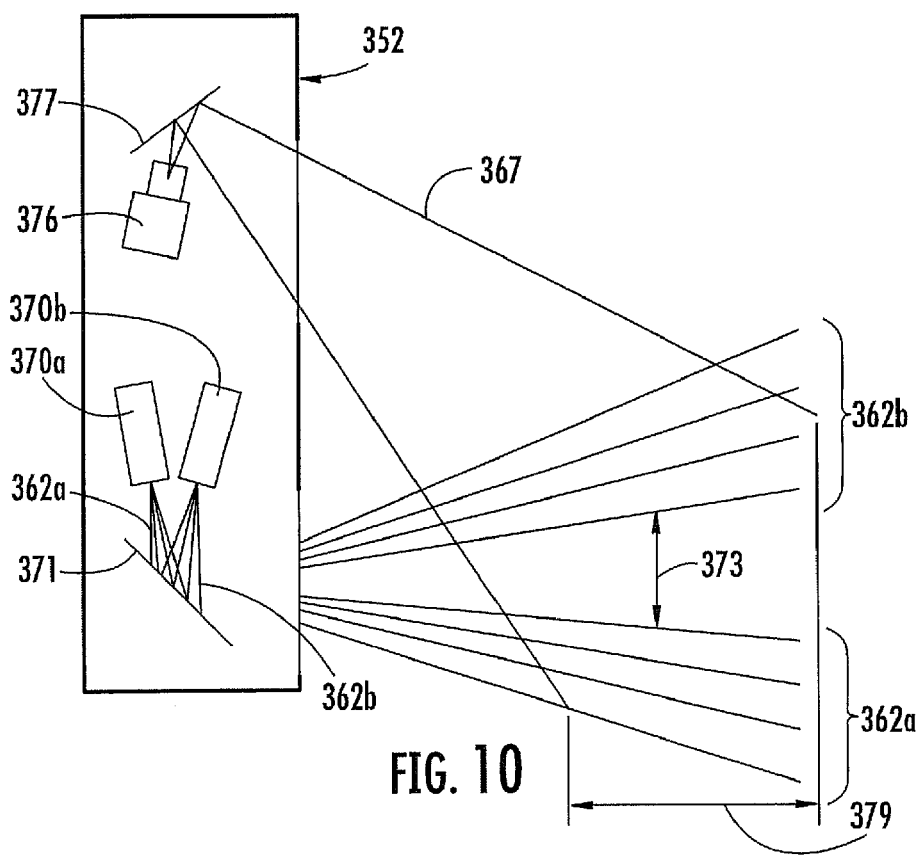
FIG. 10 is a side elevation view of still another sensor in accordance with the present invention.

Referring now to FIGS. 9 and 10, schematic illustrations of alternative sensors 252 and 352 are shown that are of generally like construction to sensors 52 and 152. The common or similar components or elements of sensors 252 and 352 are shown with similar reference numbers as used in FIGS. 4-8B with respect to sensors 52 and 152, but using the reference series "200" and "300", respectively. It should be understood that, because of the similarity of sensors 252 and 352 to sensors 52 and 152, not all of the specific construction and alternatives of like referenced parts will be discussed.

Sensor 252 of FIG. 9 includes a multi line light projector 270, a single line reference light projector 272, a camera device 276, and a processor (not shown). As shown, light projector 270 and reference light projector 272 are directed generally downwardly with reference light projector oriented at an angle relative to projector 270. Sensor 252 further includes a reflector device 271 for directing light planes 262 projected from light projector 270 and the single reference light plane 265 projected from reference light projector 272 toward a tire and wheel assembly. As illustrated, light projector 270 divergently projects light planes 262, which then form multiple parallel illumination lines on the tire sidewall. Similarly, reference light plane 265 also forms a reference illumination line on the tire sidewall.

A second reflector device 277 directs reflected images from the tire and wheel assembly of the illumination lines and reference illumination line produced by projector 270 and reference projector 272, respectively, at camera 276, with camera 276 being directed generally upward. As illustrated in FIG. 9, camera 276 thus has a field of view 267 within which it is able to receive reflected images from the tire and wheel assembly of the illumination lines and reference illumination line. The orientation of the field of view 267 relative to the projection of light planes 262, and the presence of multiple light planes 262 forming multiple illumination lines on the tire, improves the working area or volume over which sensor 252 is able to operate. As illustrated, sensor 252 has a working depth 279, which in the illustrated embodiment is approximately 250-300 mm, within which illumination lines will be formed on the tire and wheel assembly by light planes 262 and within which camera 276 will be able to view the illumination lines.

Sensor 352 of FIG. 10 includes a pair of multi line light projectors 370a and 370b oriented at an angle relative to each other, but does not include a reference light projector. Light projector 370a divergently projects multiple light planes 262a and light projector 370b divergently projects multiple light planes 262b, with light planes 262a and 262b being projected at reflector device 371. Reflector device 371 redirects light planes 262a and 262b at a tire and wheel assembly, with light planes 262a forming a series of parallel illumination lines on the tire sidewall and light planes 262b forming a second series of parallel illumination lines on the tire sidewall. A gap or space 373 is formed between the projected light planes 262a and 262b by the angular orientation of light projectors 370a and 370b relative to each other and reflector device 371. Sensor 352 also includes a camera device 376 and a processor (not shown) with a second reflector device 377 provided to direct images to camera device 376 reflected from the tire and wheel assembly of the illumination lines formed on the tire sidewall by the projected light planes 262a and 262b. Camera device 376 thus has a field of view 367 within which camera device 376 is able to receive reflected images. The images received by camera device 376 are then processed to determine the tangential plane and three dimensional coordinates of the high points of the tire sidewall, such as by, for example utilizing the processor. Similar to sensor 252, sensor 352 has an improved working depth 379, which in the illustrated embodiment is approximately 250-300 mm, within which illumination lines will be formed on the tire and wheel assembly by light planes 362 and within which camera 376 will be able to view the illumination lines.

Sensors 52, 152, 252, and/or 352 may be constructed by or include components provided by LMI Technologies, Inc., of Delta, British Columbia, Canada. Such components provided by LMI Technologies, Inc. may include light projectors, reference light projectors, camera devices, and processors, as well as software for processing images of reflected illumination lines received by such camera devices. Examples of technology developed, held, licensed, or used by LMI Technologies, Inc. providing dimensional determinations utilizing high speed camera based sensors are disclosed in the following United States patents: U.S. Pat. Nos. 5,811,827; 5,510,625; 5,362,970, and; 5,164,579.

Figure 13A:
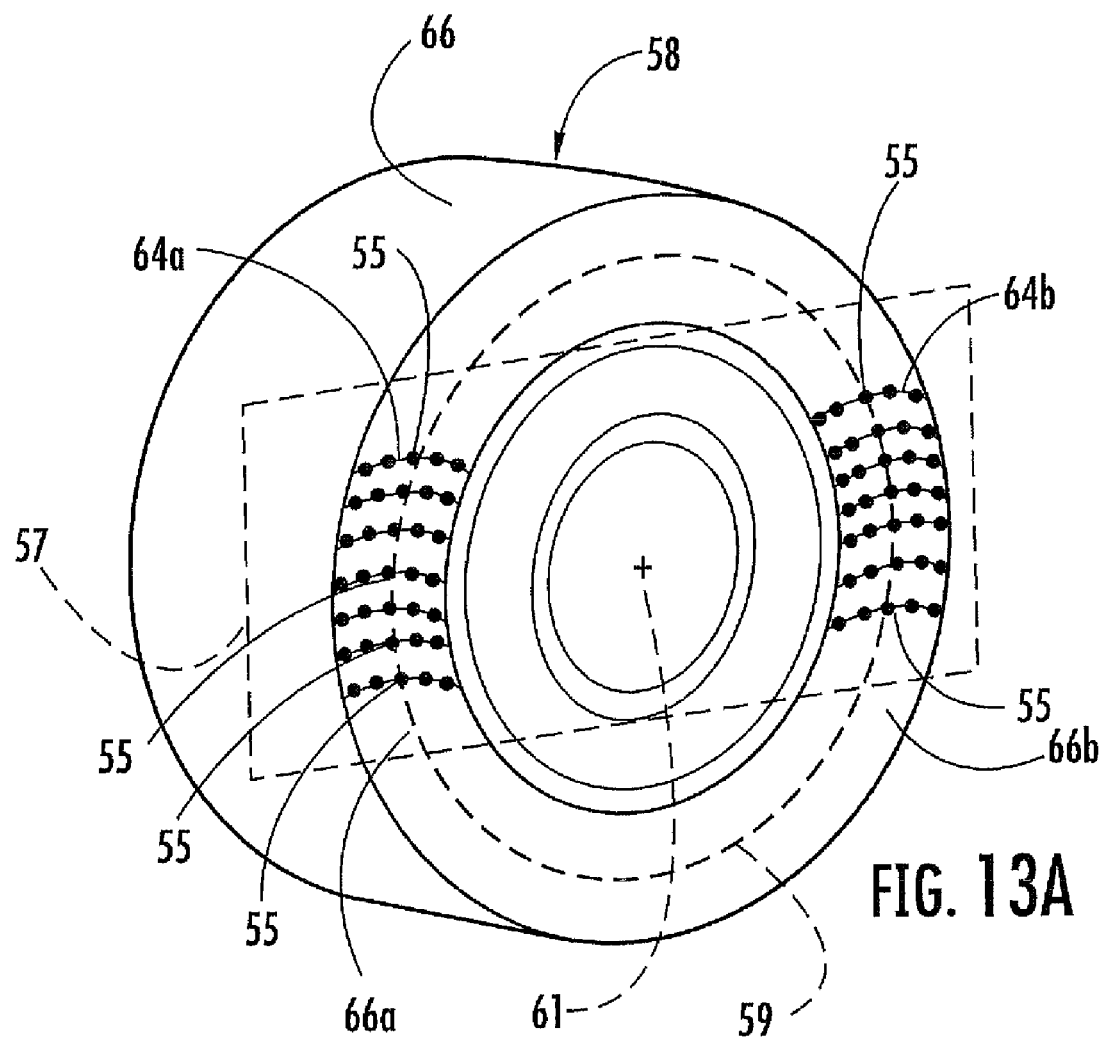
FIG. 13A is a perspective view of a tire and wheel assembly illustrating illumination lines projected onto the left and right side portions of the tire and schematically illustrating points on the tire along the illumination lines and a tangential plane to the assembly.

FIGS. 9, 10 and 12 illustrate the projection of a limited number of light planes, with FIGS. 1, 13 and 13A illustrating the formation of a limited number of illumination lines on the tire sidewall. It should be appreciated that sensors 52, 152, 252, and/or 352 may be alternatively adapted to project numerous light planes, such as 20 to 30 light planes each, for example. In such an embodiment the field of view of the associated camera devices may not visualize all of the resulting illumination lines formed on the tire sidewall. For example, the camera device may only observe 15 such illumination lines. In one preferred embodiment, a sensor projects approximately 15 light planes and views approximately 10 to 12 illumination lines, As described below, it may thus be necessary for the sensors to determine which of the illumination lines are in the field of view to determine the tangential plane representing wheel toe and camber.

As illustrated in FIGS. 1, 12 and 13, the projected light planes 62 from light projector 70 result in curved illumination lines 64 formed on the tire 66 due to the natural curve or bulge in the tire sidewall and to the angled projection of light planes 62 onto tire 66. The single projected plane of light projected from the reference light projector 72 similarly creates the reference illumination line 74 on the tire 66, but at the smaller angle noted above. Although illumination lines 64 and reference illumination line 74 are simultaneously shown on tire 66 in FIG. 13, it should be understood, as described below, that illumination line 74 is projected separately and not projected with illumination lines 64. In arrangements projecting light planes at orientations approximating right angles to the tire sidewall the curvature of the resulting illumination lines will be less pronounced as compared to when the light planes are projected at an angle. However, the angular orientation of the camera devices to the tire sidewall in such embodiments, or the orientation of the field of view of the camera devices at an angle, results in the detected images of the illumination lines being viewed as a curve due to the natural bulge in the tire sidewall. Still further, divergently projected light planes may result in, such as illustrated in FIG. 9, a portion of light planes being projected at orientations approximating right angles, a portion of light planes forming downwardly directed curved illumination lines, and a portion of light planes forming upwardly directed curved illumination lines. It should also be appreciated that the illustrated angle of divergence and curvature of illumination lines illustrated throughout the figures is not to scale.

The general operation of the sensors will now be described with reference to sensors 52. As noted, reflected images of illumination lines 64 on tire 66 are received by sensor 52. In operation, the images captured by camera device 76 are sent to processor 68 for image processing operations that search for the pixels in the image belonging to a particular illumination line 64. Thus, the processing groups or classifies the pixels per line. The manner in which a particular illumination line 64 is identified in the image is described more fully below. The curved shape of the illumination lines 64 are approximated by polynomials of minimum second order. Once the reflected illumination lines 64 have been identified in the image, their parameters are used to calculate three dimensional spatial coordinates for specific or selected points on the curved illumination lines 64 located on tire 66. In the illustrated embodiment, this processing is performed in the processor 68 of the sensor 52. It should be appreciated, however, that such processing may be done in an alternative system, such as a remote central computer or the like. As also described in detail below, pre-recorded calibration data sets relative to the sensor 52 may be used to perform the transfer of the imaged curve parameters to the three dimensional spatial coordinate system of the curved illumination lines 64 located on tire.

With reference to FIG. 13A, the determined three dimensional spatial coordinates of the selected or specific points may be or may be used to locate the high points (represented for illustration purposes as 55 in FIG. 13A) of the illumination lines 64 projected on tire 66, such as by triangulation and/or by comparison to pre-recorded calibration data sets relative to the sensor. From the best fit plane 57 calculated through those points 55 the camber and toe angles of the tire and wheel assembly 58 can be determined by known techniques. Further, because those high points 55 define a circle 59 concentric in space about the center point 61 of the round/circular tire and wheel assembly 58, the three dimensional spatial location of the center of the wheel may be calculated. In addition, by determining the plane 57 and wheel centers 61 for each of the four tire and wheel assemblies 58 about the vehicle 60, the position and orientation of the vehicle axles can be calculated or determined and the toe and camber angles may be referenced with respect thereto and to the vehicle centerline.

A plane 57 may be calculated through the selected high points 55 produced by a single sensor 52 operating to project illumination lines 64 and receive the reflected images thereof on only one side of a tire 66 based on the non-linear, concentric orientation of the high points about the wheel center. However, the use of two sensors 52a, 52b symmetrically located on either side of the tire 66, as shown in FIG. 1, enhances the precision of the toe angle measurement with the output of both sensors 52 being combined to refine the toe angle 54 calculation, as well as the wheel center position. Still further, a single sensor, such as sensor 52, 152, 252, or 352, may be oriented to simultaneously project light planes onto both sides of a tire about a wheel. The sensor processor or other centralized computer system in such an embodiment then, for example, differentiates the reflected illumination lines based on the side of the tire from which they are reflected, such as by associating groups of pixels within a camera device to a particular tire sidewall area about the wheel. U.S. Pat. No. 4,745,469 filed by Waldecker et al. and entitled VEHICLE WHEEL ALIGNMENT APPARATUS AND METHOD discloses a method for deriving three dimensional spatial coordinates based on contour lines projected onto a tire sidewall and is hereby incorporated herein by reference.

Alternatively, sensor processors 68 may additionally determine three dimensional spatial coordinates of multiple additional points along each illumination line 64 from the reflected image of the illumination line 64 received by the associated camera device 76, such as by triangulation and/or by comparison to pre-recorded calibration data sets relative to the sensor. For example, in addition to determining high points 55 on illumination lines 64, processors 68 may determine three dimensional spatial points on either side of high points 55 or even three dimensional spatial points along the entire illumination line 64, such as based on pixels in camera 76. Separate equations representing each curve in three dimensions may then be derived by fitting a curve to each illumination line 64 on tire 66 utilizing the multiple three dimensional spatial coordinates for each line 64. A determined plane 57 tangential to those curves thus represents the wheel toe and camber. The intersection points of the determined plane 57 with the calculated three dimensional curve equations are also determined by the processor, with the intersection points representing the high points 55 of the illumination lines 64. The high points 55 may be used as previously noted to determine the wheel center point 61 for calculating additional axle geometry including about the vehicle centerline using known techniques.

Operation of one particular embodiment in which multiple three dimensional spatial coordinates are obtained along illumination lines 64 will now be discussed with reference to FIGS. 13A and 13B. As the tire and wheel assembly 58 is rotating camera device 76 takes snapshots or frame images of the reflected illumination lines 64 within the camera field of view (267 in FIG. 9). For each frame, three dimensional coordinates of multiple points on tire 66 along each imaged illumination line 64 are determined and the three dimensional best fit curve equations for each line are derived. Subsequently, for each frame image, the three dimensional curve equations are first compared to a reference plane (P0 in FIG. 13B), where reference plane P0 may represent the plane Y=0 in FIG. 11. Each curve equation is searched for the point PTi that is closest to plane P0. Upon determining the point PTi for each curve equation, a new plane Pi is derived as a best fit plane to the points PTi. Subsequently, the curve equations are searched again for the point PTi+1 for each curve equation that is closest to the plane Pi. Again, a new plane Pi+1 is derived as a best fit plane to the points PTi+1. This is repeated iteratively, for example three or four iterations for each frame, to arrive at plane 57. Correspondingly, the final points PTi+y, where y is the number of iterations, will represent the high points 55 of the illumination lines 64. The planes 57 determined for each frame image may be averaged together to arrive at an averaged tangential plane value.

Figure 13B:
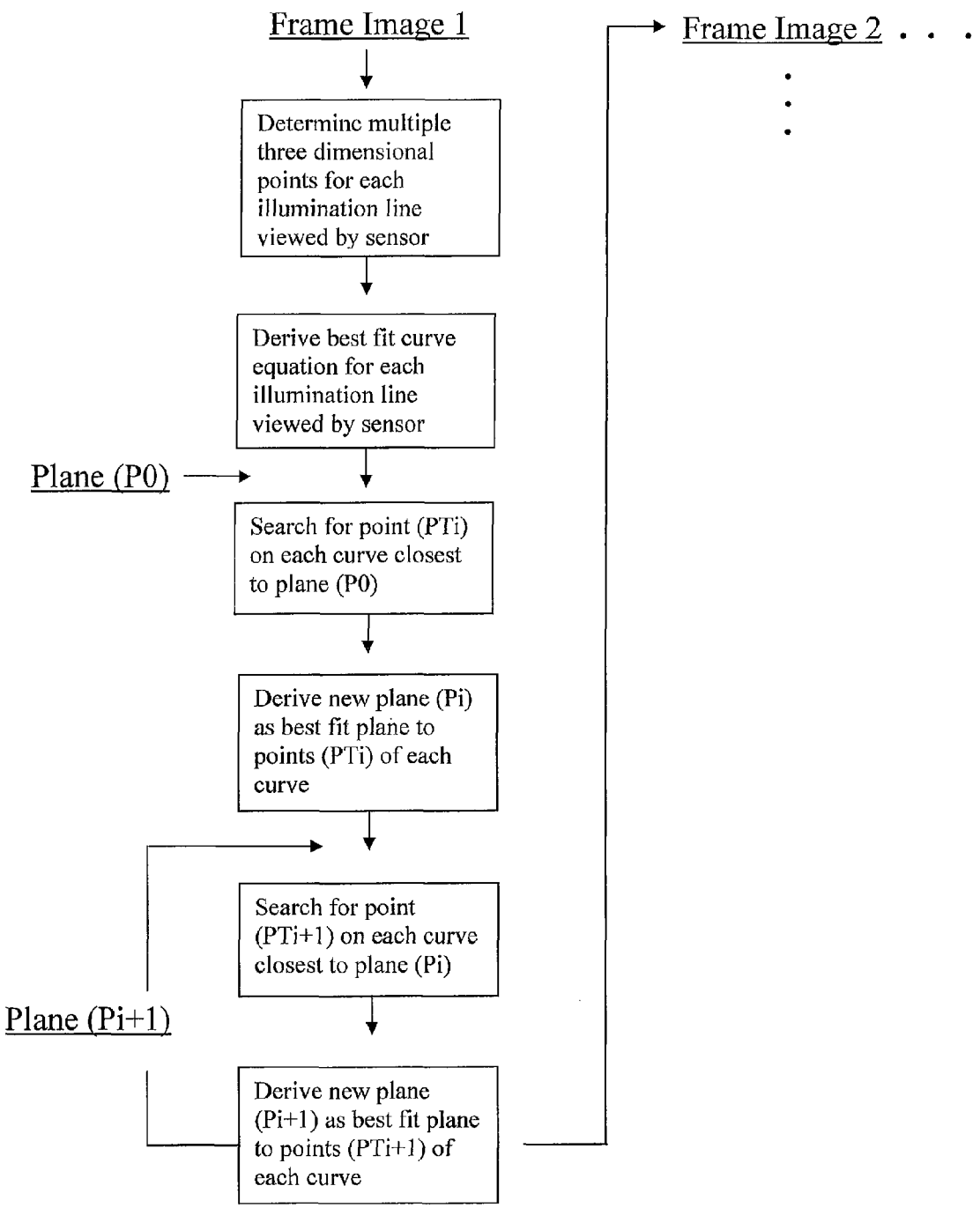
FIG. 13B is a block diagram flow chart illustrating one method of deriving a plane tangential to a tire and wheel assembly using a sensor in accordance with the present invention.

Notably, in the operation of FIG. 13B, the determined three dimensional spatial values of points on tire 66 located along illumination lines 64 are not retained in the processor 68 memory from frame image-to-frame image, nor are the derived best fit curve equations representing the illumination lines 64 retained. In addition, the sensor processor 68 may output the multiple three dimensional spatial coordinates corresponding to the imaged illumination lines 64 for subsequent determination of the corresponding three dimensional curve equations by a separate processor, such as a central computer. Alternatively, the sensor processor 68 itself may determine the three dimensional curve equations corresponding to the multiple three dimensional spatial coordinates associated with each imaged illumination line 64.

As previously noted, depending upon the position of a sensor 52 relative to a tire and wheel assembly 58, only certain of the illumination lines 64 projected onto the tire 66 will be reflected toward and received by the camera device 76 due to the projection angle 92 of light projector 70. It is necessary to determine which of the illumination lines 64 are imaged by the camera device 76 as this will impact the determination of the spatial location of the selected points of the illumination lines 64 on the tire 66. For example, if light projector 70 projected twenty illumination lines onto a tire 66, it should be appreciated that the distance between sensor 52 and tire 66 would be different depending on whether the first ten or the second ten illumination lines 64 are imaged by the camera device 76.

Further, due to the relatively close grouping or distance between illumination lines 64 on the tire 66, the pixilated image generated by the camera device 76 from the reflected images may create or experience instances in which a pixel associated with a vertically higher illumination line 64 on the tire 66 is imaged in the pixilated image generated by the camera device 76 at a lower position or orientation than pixels belonging to vertically lower illumination lines 64.

Thus, as an initial matter it is necessary to determine or identify which of the illumination lines 64 are being reflected and received by the camera device 76 and to identify groups of pixels associated with or belonging to a received image of the individual illumination lines 64. Non-contact sensor systems employing single lines at discreet locations do not encompass such challenges as there is only a single line to be viewed. Similarly, sensor systems projecting two lines that are sufficiently separated on an object also do not encompass such challenges due to the clear definition of pixel grouping based on the separation.

In embodiments such as that of FIGS. 4-6 employing a multiline line light projector 70 and a single line reference light projector 72 a two step process using reference light projector 72 and reference illumination line 74 is used to effectuate this determination of which illumination lines 64 are being imaged and thereby resolve which pixels are associated with or belong to each of the various reflected images of the illumination lines 64. As previously noted, angle 94 between reference light projector 72 and camera device 76 is sufficiently narrow such that the reference illumination line 74 may be imaged by the camera device 76 over the entire working distance, position, or volume of sensor 52.

Initially, reference light projector 72 is activated such that reference illumination line 74 is generated on tire 66. The reflected image of reference illumination line 74 is received by camera device 76 and processor 68 performs an initial first distance estimation of the distance between sensor 52 and reference illumination line 74 on tire 66. The first distance estimation is performed based on a triangulation calculation at a specific X, Z position (see FIG. 11 regarding the reference X, Y, Z coordinate system). Next, light projector 70 is activated such that illumination lines 64 are generated on tire 66 and the reflected images are received by camera device 76. A more precise distance measurement is then performed by processor 68 using the first distance estimation value as an input whereby the determination of which illumination lines 64 are reflected toward and received by camera device 76 is made. For example, based on an initial calibration, such as in the exemplary manner described below, the relationship between each illumination line 64 and the reference illumination line 74 may be known for various distances of an object from sensor 52. As such, based on the reflected image received by camera device 76, a determination may be made by processor 68 which of all possible illumination lines 64 is the particular illumination line 64 closest to the reference illumination line 74. For each candidate illumination line 64 a resulting measured distance will be corresponding and the illumination line 64 distance that is closest to the distance estimation is the chosen candidate solution such that the according illumination line 64 number may be determined.

Subsequently, the line number of the remaining illumination lines 64 is readily determined by increasing or decreasing order.

In the illustrated embodiment, light planes 62 are projected to form generally uniform illumination lines 64 on tire 66. In an alternative embodiment, illumination lines may be projected to enable identification of the particular illumination lines that are reflected toward and received by a camera device without the use of a reference light projector and reference illumination line. For example, illumination lines may be projected omitting a middle light plane such that a central illumination line on the tire is missing, or two illumination lines may be generated which are in closer proximity to each other than the remaining illumination lines, or an illumination line may be generated which is thicker than the remaining illumination lines, or the like. In this manner a processor may readily discern the identity and the location of the various illumination lines that are reflected toward and received by a camera device using the non-uniformity or irregularity of the illumination lines as a reference. It should be appreciated that, in such an embodiment, a reference light projector may not be required.

In the sensor 352 of FIG. 10, the gap 373 between light planes 362a from multiline light projector 370a and light planes 362b from multiline light projector 370b may be used by a processor within sensor 352 to discern the identity and location of the various illumination lines reflected from the tire sidewall.

Upon determining which of the illumination lines 64 are reflected toward and imaged by camera device 76, the image of the various reflected illumination lines 64 is scanned to classify the pixels belonging to each reflected image using techniques known in the art. Upon conditioning for noise reduction and filtering, the acquired image is scanned pixel by pixel such that each pixel may be classified or grouped as belonging to or associated with a particular illumination line 64, or alternatively not associated with a reference line, based on its illumination level and on its neighboring pixel. This classification procedure is performed on each image both during measurement, as well as during calibration described below.

Calibration

Figure 11:
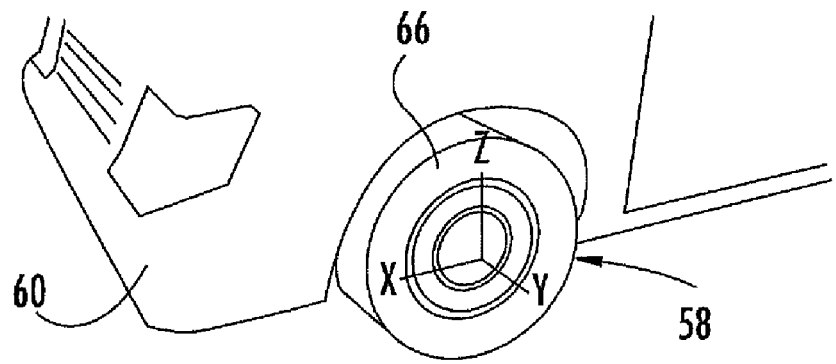
FIG. 11 is a perspective view of the tire and wheel assembly of a vehicle illustrating a suitable coordinate axis reference frame.

Referring now to FIGS. 14-17, the following will provide an explanation of one possible method for calibration of sensors 52 that may be used for determining the actual three dimensional spatial orientation of the high points or selected points of the illumination lines 64 on the tire 66 (see FIG. 11 for the coordinate X, Y, Z reference system). As shown in FIG. 17A, a vertically oriented calibration block 96 having a grid 98 of horizontal and vertical grooves or lines is positioned on test bed 90 in viewing relation to sensor 52. Calibration block 96 is sized such that all of the illumination lines 64 projected by sensor 52 will be projected onto calibration block 96 through the complete field of view of sensor 52.

Figure 14:
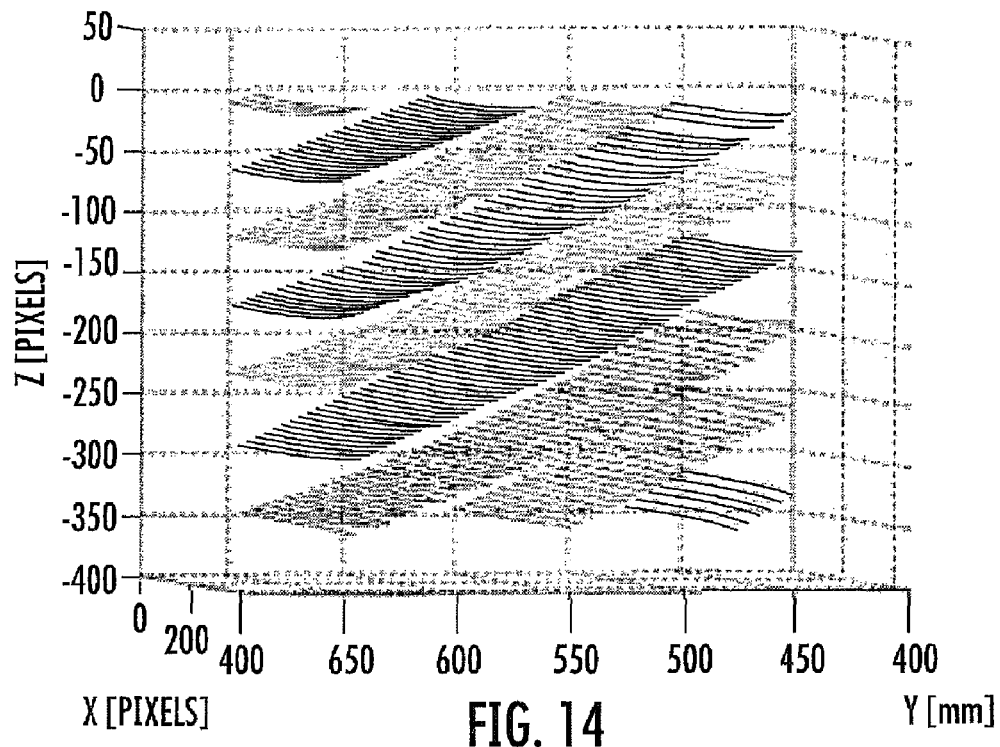
FIG. 14 illustrates multiple calibration curves for reflected illumination lines over various calibration positions relative to the coordinate axis reference frame.

During calibration, calibration block 96 is progressively moved away from the sensor 52 in the negative Y direction in accurately known steps. At each known Y position throughout the steps an image is taken of the illumination lines 64 projected onto calibration block 96 (such as shown in FIG. 17B), such that the images may be mapped as generally illustrated in FIG. 14. For each known Y position, processor 68 determines an equation fitting a curve through each illumination line 64 identified in the image reflected from the calibration block 96 and received by camera device 76. The fitted curve equation thus describes the Z image coordinate as a function of the X image coordinates. The Y-calibration data for sensor 52 thus consists of the polynomial coefficients of the fitted XZ curve for each illumination line on every calibrated Y position. During measurement sensor 52 is thereby able to calculate the three dimensional spatial Y coordinate as a function of the imaged coordinates determined by the camera device 76 of the reflected illumination lines 64.

Calculation of the X and Z three dimensional spatial coordinates may be accomplished by calibration in the X-Z direction. Such calibration may be performed, for example, using grid 98 of calibration block 96. As noted, grid 98 includes multiple vertical and horizontal lines or grooves, with grid 98 having a known spacing between the grooves. Calibration may be performed by deactivating light projector 70 and reference light projector 72 and shining an external light onto grid for improved contrast. Camera device 76 is then used to record an image of grid 98 at multiple known Y positions. Processor 68 then identifies the lines of grid 98 and their XZ coordinates in the image. The correspondence between the X and Z image distances of the imaged lines by camera device 76 and the actual known real distances or spacing of the lines on grid 98 is thus calibrated over several known Y positions.

Figure 15:
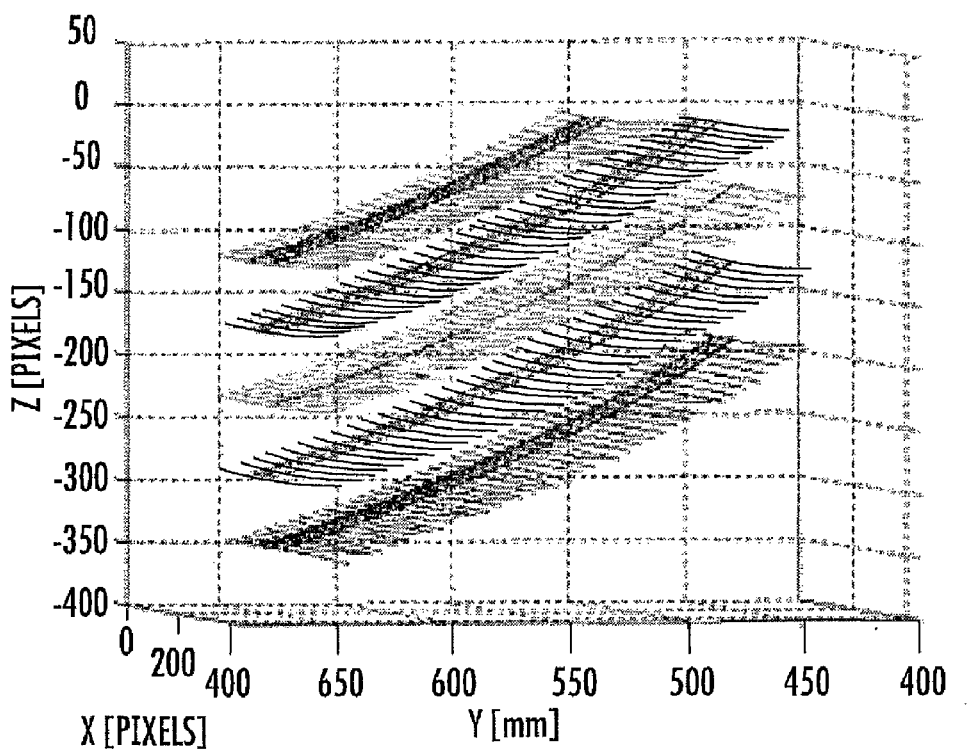
FIG. 15 illustrates intersection points of the X1 plane with calibration curves corresponding to particular illumination lines and polynomial curves through these intersections relative to the coordinate axis reference frame.
Figure 16:
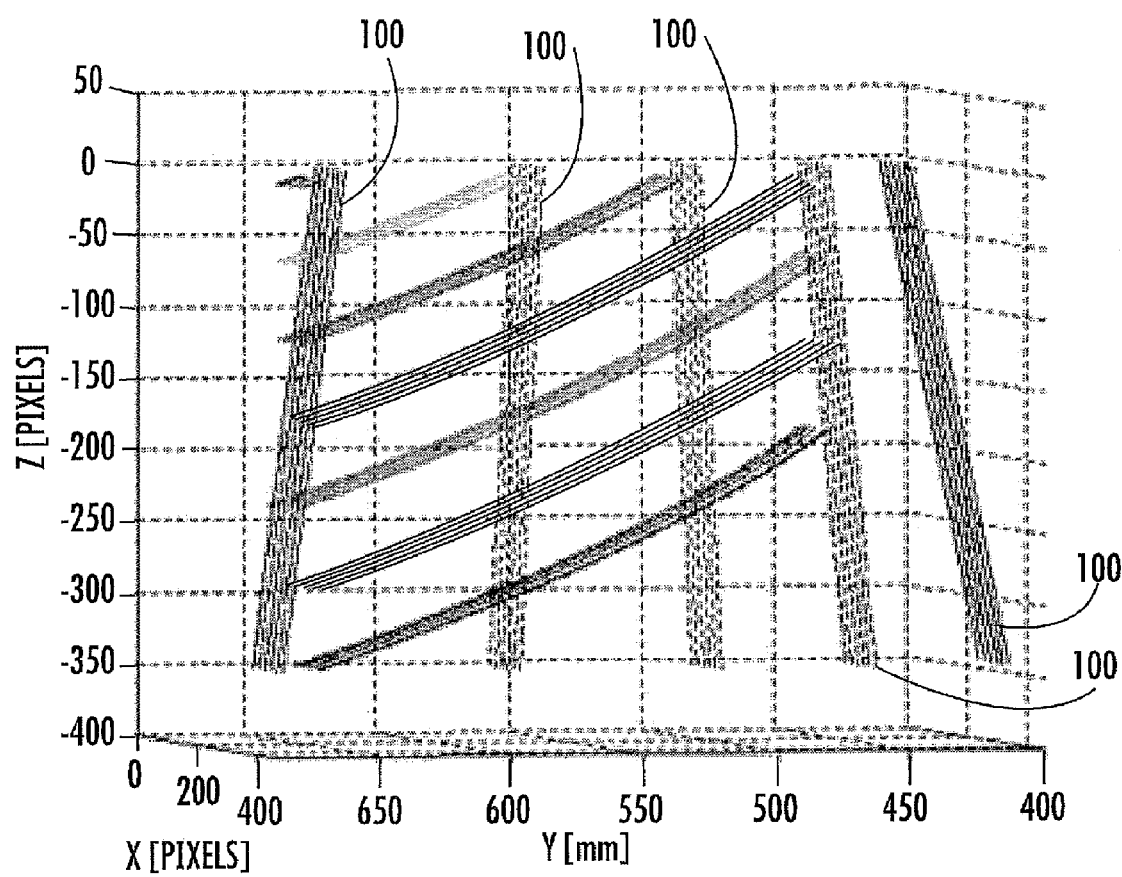
FIG. 16 illustrates multiple potential planes of the tire and wheel assembly prior to determination of the real plane.

Referring to FIGS. 14-17, as noted FIG. 14 illustrates the multiple calibration curves for each reflected illumination line 64 over the various calibration positions. FIG. 15 illustrates the intersection points of the X1 plane with the calibration curves corresponding to the particular illumination lines 64 and the polynomial curve fits through these intersections. FIG. 16 illustrates the multiple potential planes of the tire and wheel assembly 58 prior to determination of the real plane accomplished via the reference illumination line 74, as described below. Each series of dotted lines 100 illustrated in FIG. 16 represents a possible plane through the measuring points of the consecutive illumination lines 64. However, only one such plane is the actual plane of the tire and wheel assembly 58 such that that determination must be performed in order to obtain the actual plane.

Calibration in the above manner of both the Y and X-Z directions thus enables the sensor 52 to output three dimensional spatial absolute XYZ coordinate values, This coordinate system is provided by the grid 98 (X-Z) and by the translation table (Y) used for positioning of calibration block 96. The determined sensor XYZ spatial coordinate system may then be translated or transferred to a vehicle coordinate system by use of, for example, master jigs. Specific measurements on the master jig, and calculations based on those measurements permit the translation or transfer of data from the sensor coordinate system (XYZ) to the vehicle coordinate system.

It should be appreciated that alternative calibration procedures may be employed within the scope of the present invention, including but not limited to use of alternative calibration blocks and mathematical or computational approaches.

Measurement Algorithm

The following will now provide a more detailed description of one possible measurement algorithm that may be used during operation of sensors 52 in determining the three dimensional tire and wheel assembly 58 orientation. It should be appreciated, however, that alternative approaches or algorithms may be employed within the scope of the present invention.

During the measurement process, once the illumination lines 64 reflected and received in the camera device 76 have been identified and parameterized in terms of a polynomial fit, any point belonging to the curve can be characterized by its three dimensional spatial absolute (XYZ) coordinates. For example, consider the point (X1,Z1). For each fitted XZ curve belonging to a single projected light plane 62 and for each calibrated Y position, the corresponding Z image coordinate may be calculated for X1. This is performed for every calibrated Y position and a series of YZ coordinates (X=X1) is obtained. A curve fitting, second or third order, is done through these points and a YZ polynomial curve equation is generated. The intersection point of this curve with the Z=Z1 plane may then be calculated, which gives a point with X=X1 and Z=Z1 from which the real Y coordinate is known, that being the distance to the sensor 52 in the Y direction. This point is calculated for each light plane 62 projected by light projector 70 and, correspondingly, each illumination line 64, with its corresponding Y calibration images. The resultant is a set of candidate $X1Y_iZ1$ points. Determination of the specific illumination line 64 and corresponding light plane 62 to which these points belong enables a precise determination of the correct measuring coordinate.

Referring back to reference light projector 70 and reference illumination line 74, the distance estimation previously described that is performed via the reference illumination line 74 enables a determination of the actual or real measuring point. Upon determining the correct Y coordinate for a given candidate point the illumination line 64 from which it is reflected may be determined. For that point the real XZ coordinates are calculated based on the XZ calibration. Then, for the other lines in the camera device 76 measuring image the particular illumination line 64 number and thus projected light plane 62 is then known. The process of taking a point X1, Z1 and calculating the X1Y1Z1 three dimensional spatial coordinates may then be repeated, with the projected light plane 62 to which it belongs being known such that there exists only one resulting candidate measuring point.

The distance estimation for the high point is only done once per image, for the high point of the reflected and received illumination line 64 that is the closest to the reflected and received reference illumination line 74 viewed in the camera device 76 image of the first estimation measurement. Once it is determined from which projected light plane 62 and illumination line 64 that point originates, it is known that the reflected and received illumination lines 64 above and below are from the illumination line 64 projections of the sequentially previous and following light planes 62. In this manner the high point of each reflected and received illumination line 64 in the camera device 76 image may be calculated and identified such that the three dimensional spatial coordinates of those points of the illumination lines 64 on the tire 66 can be calculated. Correspondingly, the determined three dimensional spatial high point coordinates allow calculating a best fit plane there through, with the angles of this plane in the vehicle coordinate system directly establishing the camber and toe angles 56, 54.

It should be appreciated that the located high point for a given two dimensional image of an illumination line 64 imaged by the camera device 76 may not necessarily be the physical high point of the tire 66 at the given illumination line 64, but rather may be the point of the tire 66 positioned closest to the camera device 76. For example, if the tire and wheel assembly 58 is substantially perpendicular to sensor 52, such that there is generally no toe angle, the located high point will be the physical high point of the tire 66. However, this will not be the case if a non-zero toe value is present. Therefore, the two dimensional image curves may be rotated over the initial estimated toe value with the resulting new high point of the illumination line 64 recalculated, resulting in a new toe value.

After multiple iterations of this process stable toe values will be generated, which values may be considered the actual toe value.

An alternative method to compensate for the discrepancy between a located high point for a given two dimensional image of an illumination line 64 imaged by the camera device 76 and the physical high point of the tire 66 at the given illumination line 64 is by calculating the three dimensional spatial coordinates of multiple selected points belonging to an illumination line 64 and generating three dimensional curve equations. The tangential plane to the three dimensional curve equations may then be calculated, which directly represents the plane through the high points of the tire 66 and may directly yield camber and toe angles 56, 54.

The above provide two alternative techniques for compensating for the discrepancy between a located high point for a given two dimensional image of an illumination line 64 imaged by the camera device 76 and the physical high point of the tire 66 at the given illumination line 64. In the first approach, imaged illumination line 64 high points are determined in two dimensional coordinates, converted to three dimensional coordinates and a plane is calculated fitting through the three dimensional coordinates. In the second approach, the imaged illumination line 64 curves are initially converted to three dimensional coordinates and the tangential plane through them is directly calculated. The second approach does not involve the iterative process of toe estimation and curve rotation whereby an initial or estimated toe is not calculated prior to determining the final toe and camber values. It should be appreciated, however, that such compensation may not necessarily be required depending on the application or specified measurement parameters.

FIG. 1 illustrates the use of sensors 52*a*, 52*b* positioned generally symmetrically about the left and right sides 66*a*, 66*b* of the tire and wheel assembly 58. It should be appreciated, however, that alternative measuring apparatus arrangements using sensors may be employed and still function as intended within the scope of the present invention. For example, an alternative arrangement may employ a single sensor projecting illumination lines and receiving reflected images at the entire tire and wheel assembly. Such a sensor may contain alternative optics to spread the light planes over a wider area and an alternative camera device having a larger or wider field of view. In this arrangement, the reflected images may be divided or separated, with the images reflected from one portion or side of the tire being processed separately from the images reflected from another portion of the tire, with the above noted algorithms being applied to the separately received and processed portions of the reflected illumination lines.

In the case of lasers as light projectors, it should be noted that as laser light is spread over larger areas fewer illumination lines may be projected with the same laser power to get the same light intensity of the laser lines, that is fewer lines may be projected under the same power if the lines are longer and desired to have comparable intensity as a greater number of shorter lines. The accuracy of this approach may, therefore, decrease due to the fewer lines and lower image resolution. However, this approach may be desirable in applications where lower accuracy is acceptable in view of potentially lower cost measuring apparatuses.

Still another alternative measuring apparatus arrangement would be to employ a third sensor oriented to project illumination lines and receive reflected images from the top of the tire, such as a generally twelve o'clock orientation. Such a third sensor may be positioned or arranged horizontally relative to sensors 52*a*, 52*b* shown in FIG. 1 such that the illumination line or lines are arranged generally vertically on the tire. This both increases the number of measuring points and augments the separation distance between the lowest and highest measurement points due to their separation in the Z direction, resulting in improved angular resolution and higher accuracy with which the camber angle can be measured.

Sensors may also employ internal compensation for drift, such as thermal drift, drift occurring as a result of stress relaxation, wavelength drift, or the like. Thermal drift may result as the ambient temperature changes and/or the sensor components generate heat. This thermal instability may influence the light projector, reference light projector, and/or the camera device and affect the measurement precision. One approach to thermal drift compensation is to calibrate the sensors, such as sensors 52, 152, 252, and/or 352, over multiple different temperatures such that the effects of temperature on the sensors over a given range is determined. Sensor temperature may then be monitored during normal operation of sensors in determining wheel alignment, with the temperature based calibration data being applied via interpolation to derive at temperature compensated alignment values.

Another approach to thermal drift compensation may be accomplished by identifying invariants in the illumination line light patterns. These are parameters that, with constant temperature, do not change in the image regardless of the object upon which the sensor is operating. For example, in place of illumination lines comprising a horizontal multi line pattern, an alternative multi line pattern of horizontal and vertical lines may be used, with the intersections of those lines forming the invariants in the system. In an aligned system these invariants are expected to move on a vertical line in the reflected image. A mathematical evaluation may be used to model the instability movement of those intersections via drift, such as thermal drift and permits estimation of the temperature changes causing the instability in this case. In turn, this enables compensation for thermal drift in the measuring apparatus.

An alternative compensation approach may be to deviate a portion of the reflected two dimensional illumination line pattern from one or more of the illumination lines and capture an image of the deviated portion on a reserved CCD element of the camera device. This may be accomplished through an optical system of mirrors and a lens to reflect and deviate the reflected illumination line directly to the camera device. As this optical system is by design fixed, any drift of the deviated illumination line on the CCD of camera device may be attributable to drift, such as thermal drift, of the light projector. The evolution of the deviated portion of the reflected illumination line in relation to the calibrated position is compared such that the drift of the sensor may be dynamically compensated for during the measurement process.

It should be appreciated that alternative arrangements and constructions of sensors from those described above may be employed and still function as intended within the scope of the present invention. For example, a sensor may be constructed whereby either the light projector and/or reference light projector are oriented generally perpendicularly to the tire and wheel assembly with the camera device angled with respect thereto. Further, a light projector and/or a reference light projector may be oriented to project upwards relative to a camera device. A reference light projector may also project more than one light plane or an alternatively shaped light and/or the light projector may project alternatively shaped light relative to the light planes illustrated.

Still further, as noted above, sensors 52 project light beams, which in the illustrated embodiment are light planes 62 forming illumination images disclosed as illumination lines 64.

Alternatively, however, other forms of light beams may be projected to create alternative types or forms of illumination images. For example, light beams formed as rays creating dots or spots may be projected, or light beams disclosing geometrical shapes may be projected, such as circles, squares, crosses, ellipses, or the like.

Additionally, although in the above noted measuring system 50 each sensor 52 is disclosed as including a separate processor 68, it should be appreciated that processors may be alternatively arranged. For example, a single processor may be employed, which processor is either located internally of a sensor or externally, such as in a remote central computing system. Still further, a measuring system may be constructed with two light projectors and a single camera device, or a single light projector and two camera devices. In either of these arrangements, one or more reference light projectors may be used, or may even be omitted if the light projector or light projectors are constructed to project a non-regular pattern as described above.

Sensors 52 are described above as used for determining tire and wheel assembly 58 alignment characteristics. It should also be appreciated, however, that sensors 52 may be employed for measuring or determining alternative parameters in applications where, for example, lines projected on the measurement object generate a line profile that permits extraction of specific points via the reflected line such that the three dimensional spatial coordinates for these points may be determined. One example of such an alternative application is measuring vehicle fender height. The multiple projected and reflected illumination lines permit three dimensional spatial calculation of multiple points on the vehicle fender. Each projected and reflected illumination line will show a specific falloff point on the fender and the determined curve through those points describes the fender with the highest point of the curve equating to the height of the vehicle fender.

The non-contact sensors of the present measurement system invention project multiple illumination lines onto an object, such as a tire of a tire and wheel assembly, as well as receive reflected images of the illumination lines. From the reflected images, the sensors determine three dimensional spatial coordinates of selected points of the illumination lines on the tire and determine a plane through the determined three dimensional spatial coordinates, which plane represents the orientation of the tire and wheel assembly and from which toe and camber may be calculated, as well as other alignment characteristics. The projection of multiple illumination lines provides greater precision in determining the tire and wheel assembly orientation, such as by providing an increased number of measuring points, and increases the working field over which the sensor may operate. In addition, the projection of multiple light planes enables the projection angle of the light planes to be increased, which in turn enhances the sensitivity of the sensors. Tire and wheel assembly orientation may be calculated for each illumination line imaged by the sensor, thereby providing redundancy, robustness, and enabling noise reduction. Still further, due to the generally torid shape of tires and the associated determined high points of the illumination lines projected onto the tire sidewall surface, a single image may be used to calculate camber, toe angle, and wheel center position.

Changes and modifications in the specifically described embodiments can be carried out without departing from the principles of the present invention which is intended to be limited only by the scope of the appended claims, as interpreted according to the principles of patent law including the doctrine of equivalents.

The embodiments in which an exclusive property or privilege is claimed are as follows:

1. A method of determining alignment characteristics of a tire and wheel assembly mounted on a vehicle, said method comprising:
    projecting a plurality of light planes from a first light projector onto a tire and wheel assembly to form a plurality of generally parallel illumination lines on a tire of the tire and wheel assembly;
    receiving a reflected image of at least some of said illumination lines with a photo electric device, said photo electric device receiving images of said illumination lines reflected from the tire at an angle relative to a projecting angle of said first light projector; and
    determining a plane defined by spatial coordinates from a selected point located on each said illumination line imaged by said photo electric device, said plane representing the orientation of the tire and wheel assembly and wherein said determining step further comprises:
        resolving three dimensional spatial coordinates for multiple points located on each said illumination line imaged by said photo electric device;
        deriving a best fit curve equation for each said illumination line using the three dimensional spatial coordinates from said resolving step; and
        determining said plane as a best fit tangential plane to the curve equations for each said illumination line from said deriving step, wherein the intersection of said plane with the curve equations defines said selected point located on each said illumination line.

2. The method of claim 1, wherein said projecting said plurality of light planes from said first light projector comprises divergently projecting said plurality of light planes from said first light projector.

3. The method of claim 1, further comprising:
    projecting a single light plane from a second light projector onto the tire and wheel assembly to form a single reference illumination line on the tire of the tire and wheel assembly;
    receiving a reflected image of said reference illumination line from the tire with said photo electric device; and
    determining a reference distance from said reference illumination line to a noncontact wheel alignment sensor including said first and second light projectors and said photo electric device.

4. The method of claim 3, further comprising identifying which said illumination lines are imaged at said receiving step using said reference distance.

5. The method of claim 3, wherein said second light projector is angularly oriented relative to said first light projector.

6. The method of claim 1, wherein said projecting step includes projecting said plurality of light planes from said first light projector onto a reflecting device, said reflecting device directing said plurality of light planes onto the tire and wheel assembly.

7. The method of claim 1, wherein said receiving a reflected image step includes directing with a reflecting device said at least some of said illumination lines at said photo electric device.

8. A method of determining alignment characteristics of a tire and wheel assembly mounted on a vehicle, said method comprising:
    projecting a plurality of light planes from a first light projector onto a tire and wheel assembly to form a plurality of generally parallel illumination lines on a tire of the tire and wheel assembly;

receiving a reflected image of at least some of said illumination lines with a photo electric device, said photo electric device receiving images of said illumination lines reflected from the tire at an angle relative to a projecting angle of said first light projector; and determining a plane defined by spatial coordinates from a selected point located on each said illumination line imaged by said photo electric device, said plane representing the orientation of the tire and wheel assembly;

wherein said projecting step comprises projecting said plurality of light planes from said light projector simultaneously onto both a first tire portion and a second tire portion, with the first tire portion being located about the wheel relative to the second tire portion.

9. The method of claim 8, wherein said receiving a reflected image step comprises receiving reflected images from both the first and the second tire portions.

10. A method of determining alignment characteristics of a tire and wheel assembly mounted on a vehicle, said method comprising:

projecting a plurality of light planes from a first light projector onto a tire and wheel assembly to form a plurality of generally parallel illumination lines on a tire of the tire and wheel assembly;

receiving a reflected image of at least some of said illumination lines with a photo electric device, said photo electric device receiving images of said illumination lines reflected from the tire at an angle relative to a projecting angle of said first light projector;

determining a plane defined by spatial coordinates from a selected point located on each said illumination line imaged by said photo electric device, said plane representing the orientation of the tire and wheel assembly; and determining a circle defined by the spatial coordinates from said selected point located on each said illumination line, said circle being concentric with the tire and wheel assembly, and determining a center point of said circle, said center point representing the center of the tire and wheel assembly.

11. A method of determining alignment characteristics of a tire and wheel assembly mounted on a vehicle, said method comprising:

projecting a plurality of light planes from a first light projector onto a tire and wheel assembly to form a plurality of generally parallel illumination lines on a tire of the tire and wheel assembly;

receiving a reflected image of at least some of said illumination lines with a photo electric device, said photo electric device receiving images of said illumination lines reflected from the tire at an angle relative to a projecting angle of said first light projector;

determining a plane defined by spatial coordinates from a selected point located on each said illumination line imaged by said photo electric device, said plane representing the orientation of the tire and wheel assembly;

repeating said receiving a reflected image step for multiple frames imaged by said photo electric device while the tire and wheel assembly is rotating; and repeating said determining a plane defined by spatial coordinates from a selected point located on each said illumination line imaged by said photo electric device for each frame imaged by said photo electric device.

12. A method of determining alignment characteristics of a tire and wheel assembly mounted on a vehicle, said method comprising:

projecting a plurality of light planes from a first light projector onto a tire and wheel assembly to form a plurality of generally parallel illumination lines on a tire of the tire and wheel assembly;

receiving a reflected image of at least some of said illumination lines with a photo electric device, said photo electric device receiving images of said illumination lines reflected from the tire at an angle relative to a projecting angle of said first light projector;

determining a plane defined by spatial coordinates from a selected point located on each said illumination line imaged by said photo electric device, said plane representing the orientation of the tire and wheel assembly; and repeating said receiving a reflected image step for multiple frames imaged by said photo electric device while the tire and wheel assembly is rotating;

wherein said determining step comprises determining a plane by averaging spatial coordinates from a selected point located on each said illumination line for each frame imaged by said photo electric device.

13. The method of claim 1, wherein said determining said plane as a best fit tangential plane comprises:

determining a reference point on each said illumination line that is closest to a reference plane using the curve equations from said deriving step;

determining a first plane as a best fit plane to the reference points from each said illumination line; and iteratively determining said plane by first determining said one selected point located on each said illumination line that is closest to a previously determined plane and then determining a new plane as a best fit plane to said selected point located on each said illumination line that is closest to the newly determined plane.

14. A method of determining alignment characteristics of a tire and wheel assembly mounted on a vehicle, said method comprising:

projecting a plurality of light planes from a first light projector onto a tire and wheel assembly to form a plurality of generally parallel illumination lines on a tire of the tire and wheel assembly;

receiving a reflected image of at least some of said illumination lines with a photo electric device, said photo electric device receiving images of said illumination lines reflected from the tire at an angle relative to a projecting angle of said first light projector; and determining a plane defined by spatial coordinates from a selected point located on each said illumination line imaged by said photo electric device, said plane representing the orientation of the tire and wheel assembly;

wherein said projecting a plurality of light planes from said first light projector onto the tire and wheel assembly forms approximately fifteen generally parallel illumination lines on the tire, and wherein said receiving a reflected image of at least some of said illumination lines with a photo electric device comprises receiving a reflected image of approximately ten to twelve of said illumination lines.

15. The method of claim 1, further comprising:

projecting a plurality of light planes from another light projector onto the tire and wheel assembly to form a plurality of generally parallel second illumination lines on the tire, said illumination lines from said first light projector being spaced from said second illumination lines from said another light projector;

wherein said receiving a reflected image of said at least some of said illumination lines with a photo electric device comprises receiving a reflected image of at least one said illumination line formed by said first light projector and receiving a reflected image of at least one said second illumination line formed by said another light projector.

16. The method of claim 1, further comprising monitoring temperature during said projecting and said receiving steps, and further comprises compensating for temperature during said determining step.

17. A noncontact wheel alignment sensor for determining alignment characteristics of a tire and wheel assembly mounted on a vehicle, said sensor comprising:
   a first multiline light projector that projects a plurality of light planes onto the tire and wheel assembly to form generally parallel illumination lines on the tire;
   a camera device that receives reflected images of at least some of said illumination lines reflected from the tire at an offset angle relative to a projecting angle of said first multiline light projector;
   a processor that determines a plane defined by spatial coordinates from a selected point located on each said illumination line imaged by said camera device, said plane representing the orientation of the tire and wheel assembly; and
   further comprising a single line reference light projector that projects a single light plane onto the tire and wheel assembly to form a reference illumination line on the tire, wherein said single line reference light projector is oriented to project at an angle offset from said first multiline light projector.

18. The noncontact wheel alignment sensor of claim 17, wherein said first multiline light projector divergently projects said plurality of light planes.

19. The noncontact wheel alignment sensor of claim 17, further comprising a second multiline light projector that projects a second plurality of light planes onto the tire and wheel assembly to form a second set of generally parallel illumination lines on the tire.

20. The noncontact wheel alignment sensor of claim 19, wherein said illumination lines formed by said first multiline light projector are spaced on the tire from said second set of generally parallel illumination lines formed by said second multiline light projector.

21. The noncontact wheel alignment sensor of claim 17, further including a first reflecting device, said plurality of light planes from said first multiline light projector being reflected by said first reflecting device onto the tire and wheel assembly.

22. The noncontact wheel alignment sensor of claim 21, further including a second reflecting device, said camera device receiving images of said at least some of said illumination lines reflected by said second reflecting device.

* * * * *